US011420132B2

(12) United States Patent
Hayashi et al.

(10) Patent No.: US 11,420,132 B2
(45) Date of Patent: Aug. 23, 2022

(54) ROBOT ON WHICH OUTER SKIN IS MOUNTED

(71) Applicant: GROOVE X, Inc., Tokyo (JP)

(72) Inventors: Kaname Hayashi, Tokyo (JP); Minoru Koizumi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 214 days.

(21) Appl. No.: 16/594,109

(22) Filed: Oct. 7, 2019

(65) Prior Publication Data
US 2020/0030707 A1  Jan. 30, 2020

Related U.S. Application Data

(63) Continuation of application No. PCT/JP2018/014664, filed on Apr. 6, 2018.

(30) Foreign Application Priority Data

Apr. 10, 2017  (JP) .............................. JP2017-077266

(51) Int. Cl.
*A63H 3/52* (2022.01)
*A63H 11/00* (2006.01)

(52) U.S. Cl.
CPC .............. *A63H 3/52* (2013.01); *A63H 11/00* (2013.01)

(58) Field of Classification Search
CPC ... A63H 3/00; A63H 3/52; A63H 11/00; B25J 19/0075
See application file for complete search history.

(56) References Cited

U.S. PATENT DOCUMENTS

| | | | | |
|---|---|---|---|---|
| 4,763,369 A | * | 8/1988 | Spector ................ | A63H 33/004 446/72 |
| 5,066,259 A | * | 11/1991 | Acker .................... | A63H 3/001 446/385 |
| 5,464,214 A | * | 11/1995 | Griffin ................... | A63H 33/00 312/7.2 |
| 6,431,944 B1 | * | 8/2002 | Norman ................. | A63H 3/003 446/99 |

(Continued)

FOREIGN PATENT DOCUMENTS

| | | |
|---|---|---|
| CN | 1411961 A | 4/2003 |
| CN | 101563424 A | 10/2009 |

(Continued)

OTHER PUBLICATIONS

International Search Report in PCT/JP2018/014664, dated Jun. 26, 2018. 3pp.

(Continued)

*Primary Examiner* — Eugene L Kim
*Assistant Examiner* — Alyssa M Hylinski
(74) *Attorney, Agent, or Firm* — Hauptman Ham, LLP

(57) ABSTRACT

A robot of one aspect includes an outer skin with which a main body is covered. The outer skin includes an engagement portion that engages with the main body by the main body being covered therewith, extended portions that extend from the engagement portion, and attachment members, formed of a hard material, attached to the extended portions so as to extend in a width direction. The outer skin is fixed to the main body by the attachment members being fixed to the main body.

16 Claims, 24 Drawing Sheets

(56) References Cited

U.S. PATENT DOCUMENTS

| | | | |
|---|---|---|---|
| 6,544,094 B1* | 4/2003 | Maddocks | A63H 3/365 446/337 |
| 6,565,371 B1 | 5/2003 | Watanabe | |
| 6,733,359 B1* | 5/2004 | Jacobs | A63H 13/005 446/391 |
| 7,332,011 B1* | 2/2008 | Sandberg | B01D 46/0005 55/491 |
| 2002/0164923 A1* | 11/2002 | Marine | A63H 3/24 446/484 |
| 2003/0106493 A1* | 6/2003 | Christian | B25J 19/0075 118/504 |
| 2003/0110540 A1 | 6/2003 | Fukui et al. | |
| 2004/0258877 A1* | 12/2004 | D'Andreta | B05B 15/50 428/99 |
| 2007/0192910 A1* | 8/2007 | Vu | B25J 19/06 901/17 |
| 2010/0056715 A1 | 3/2010 | Wang | |
| 2012/0156419 A1* | 6/2012 | Jackson | B29C 39/10 264/261 |
| 2015/0091215 A1* | 4/2015 | Reetz | B23K 26/046 264/400 |
| 2015/0174500 A1* | 6/2015 | Beglan | B25J 1/02 74/490.04 |
| 2015/0248145 A1* | 9/2015 | Lee | G06F 1/1677 361/679.26 |
| 2015/0375402 A1* | 12/2015 | D'Andreta | H01L 29/4966 156/60 |
| 2016/0144285 A1* | 5/2016 | Tiefel | A63H 3/48 446/321 |
| 2017/0056783 A1* | 3/2017 | Akavia | A63F 13/213 |

FOREIGN PATENT DOCUMENTS

| | | |
|---|---|---|
| JP | S64-6994 U | 1/1989 |
| JP | 2000-323219 A | 11/2000 |
| JP | 2003-117257 A | 4/2003 |
| JP | 2005-13391 A | 1/2005 |
| JP | 2010-137288 A | 6/2010 |

OTHER PUBLICATIONS

Notice of Allowance in JP Application No. 2018-569177, dated Apr. 2, 2019. 5pp.

Office Action in CN Application No. 201880021135.2, dated Mar. 8, 2022. 20pp.

\* cited by examiner

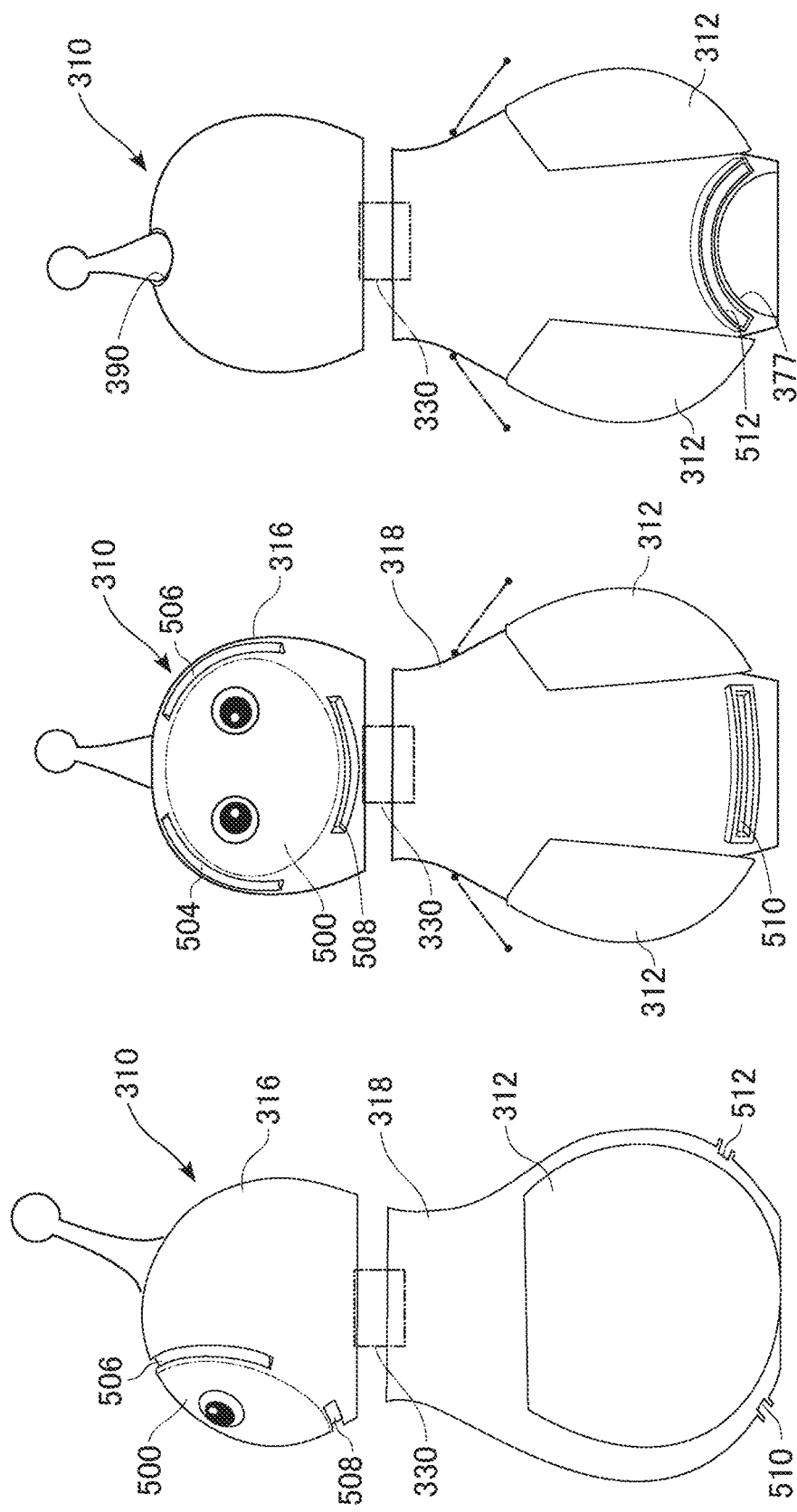

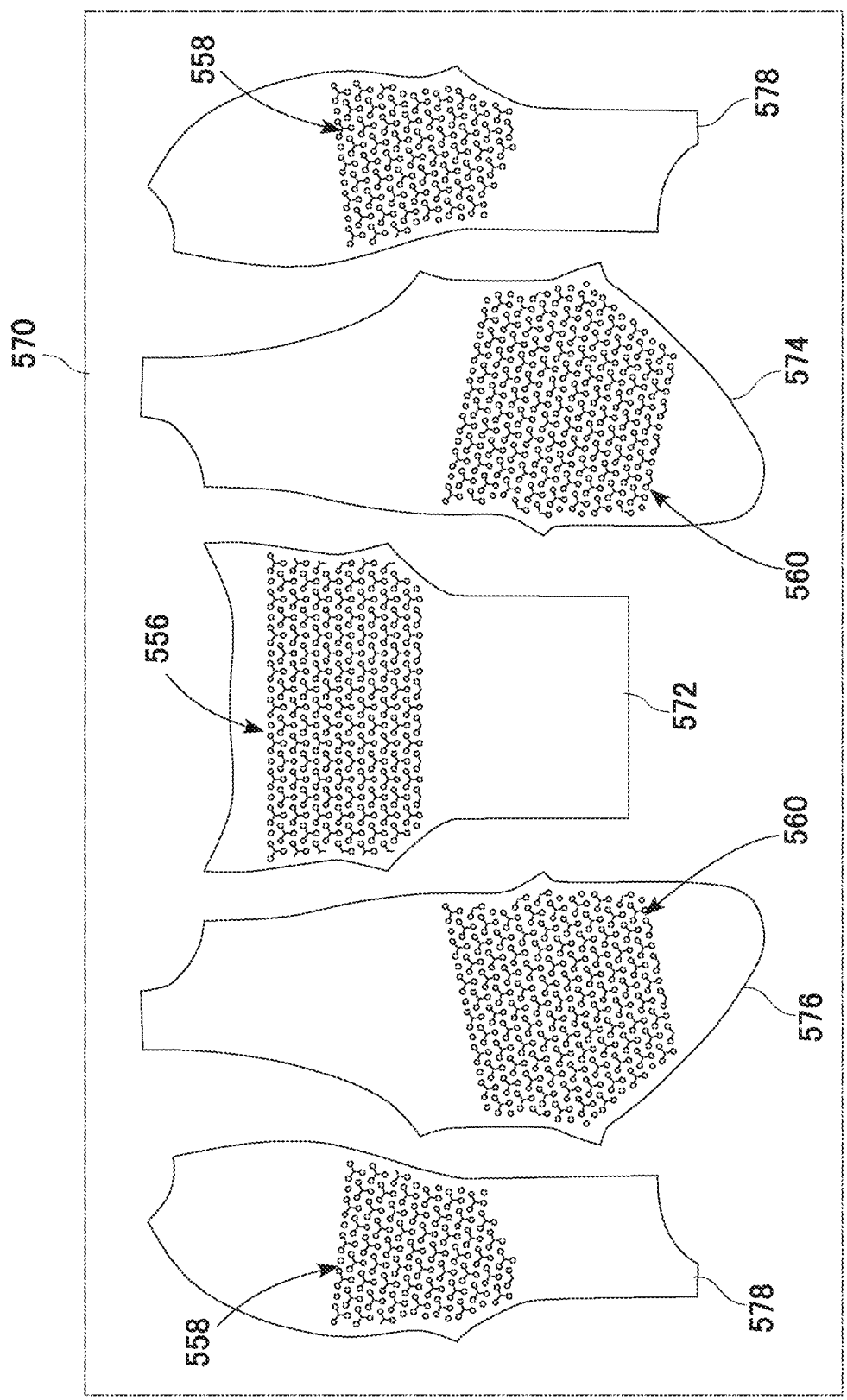

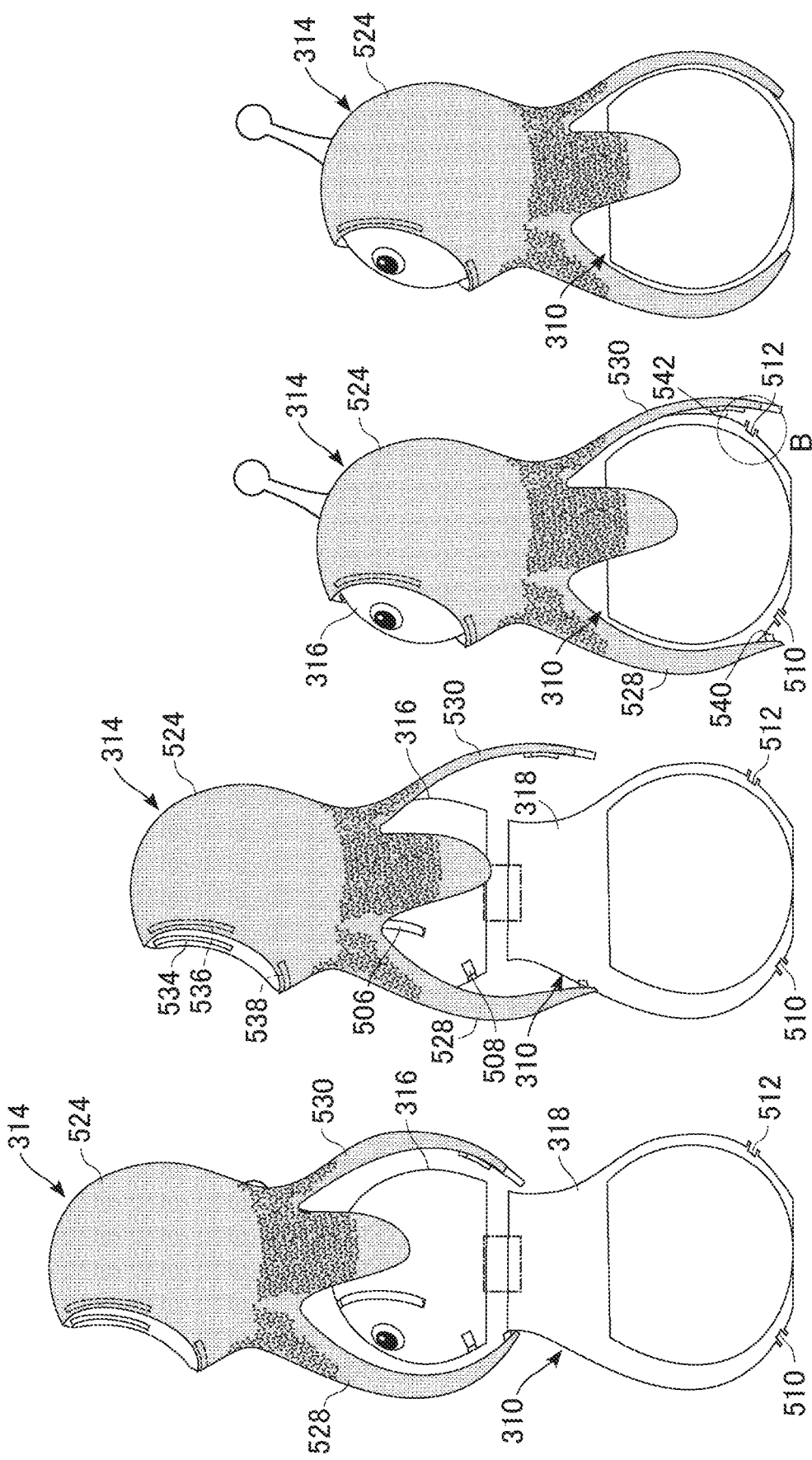

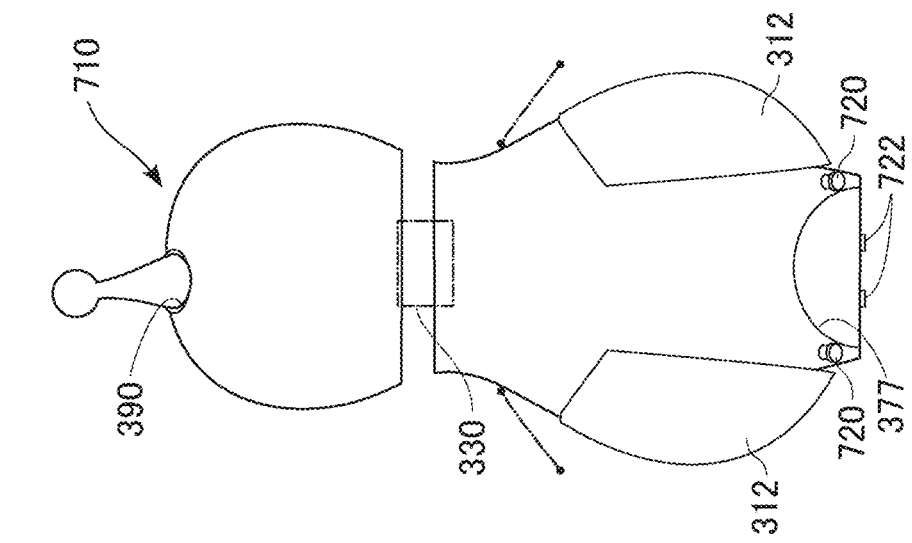

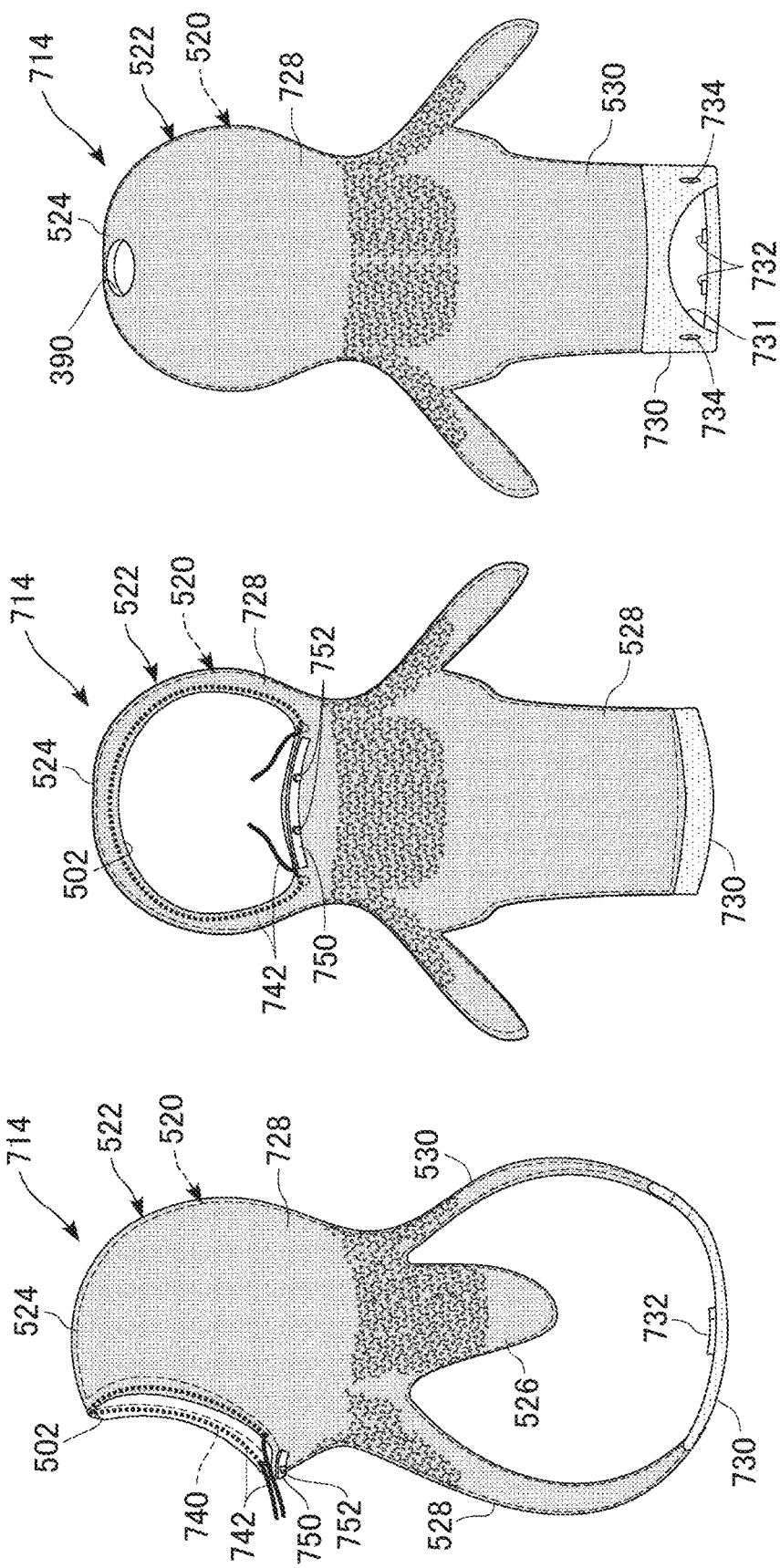

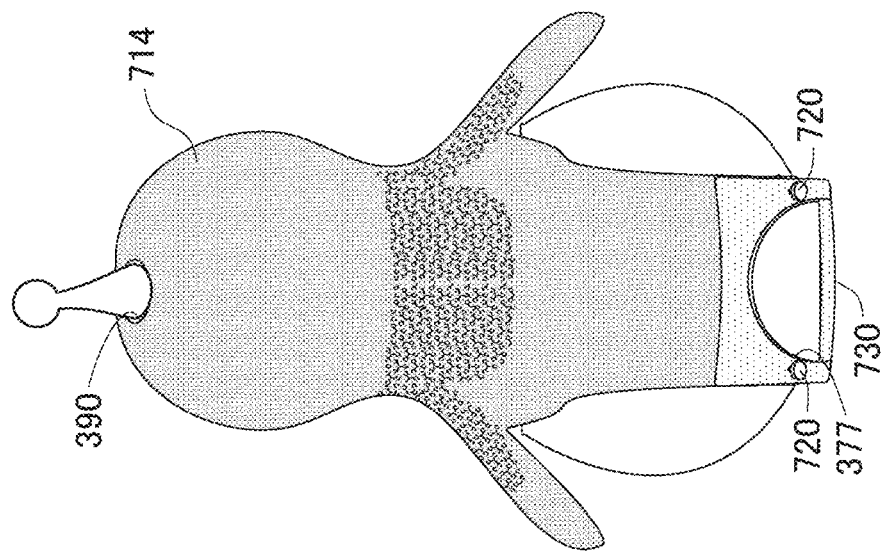
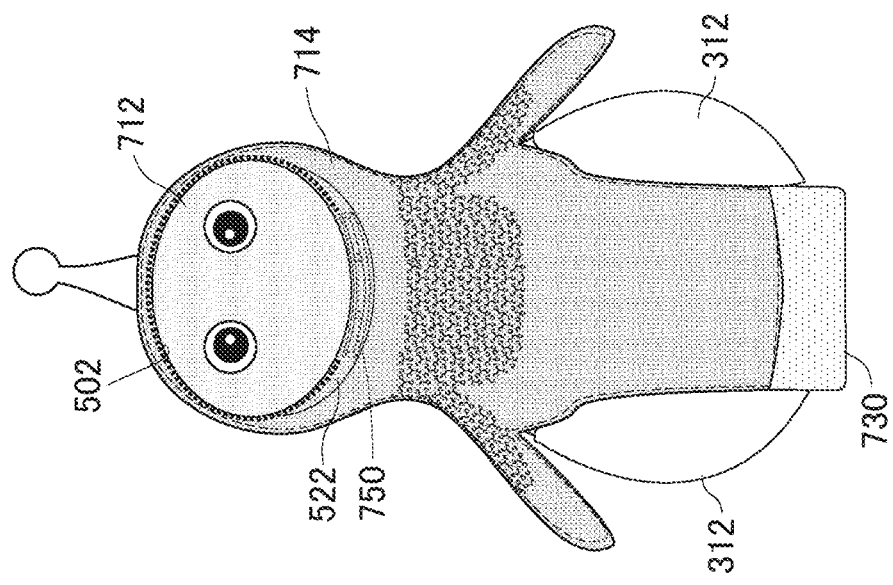
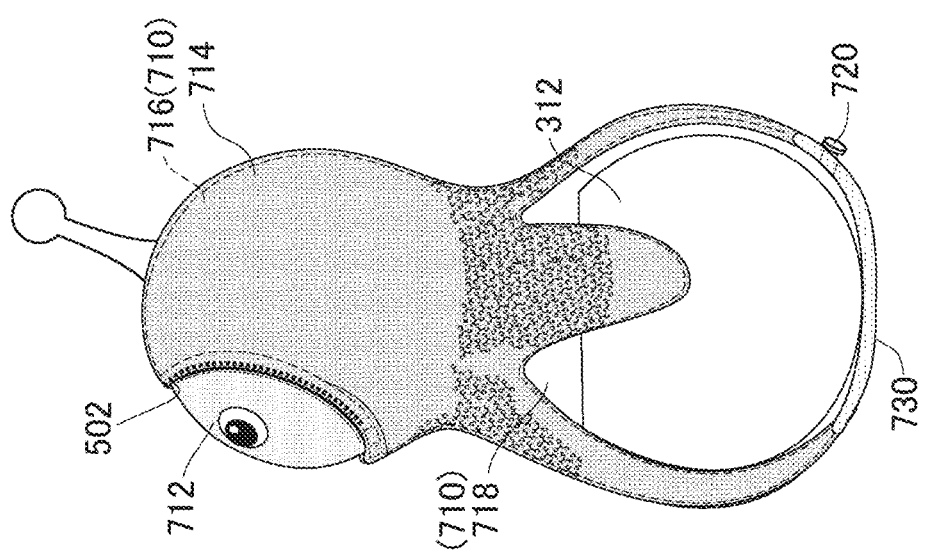

ROBOT ON WHICH OUTER SKIN IS MOUNTED

RELATED APPLICATIONS

The present application is a continuation of International Application No. PCT/JP2018/014664, filed Apr. 6, 2018, which claims priority from Japanese Application No. 2017-077266, filed Apr. 10, 2017, the disclosures of which applications are hereby incorporated by reference herein in their entirety.

TECHNICAL FIELD

The present invention relates to an outer skin covering a robot, and to an attachment structure thereof.

BACKGROUND ART

There have been advances in development of an autonomously acting robot, such as a humanoid robot or a pet robot, that provides interaction and solace for a human (for example, refer to Patent Document 1). This kind of robot is expected to cause behavior to evolve by learning autonomously based on a peripheral situation, and attain an existence close to that of a living being. In the near future, a robot might provide a user with the kind of solace evoked by a pet.

CITATION LIST

Patent Literature

Patent Document 1: JP-A-2000-323219

SUMMARY OF INVENTION

Technical Problem

When causing a robot to seem like a living being, a tactile sensation thereof is important. Being an existence such that a user involuntarily wishes to touch encourages physical closeness from the user, and causes the user to feel affection such as that felt toward a pet. In order to realize this kind of tactile sensation, covering a robot with an outer skin is conceivable. When the outer skin is like a costume, however, this causes an oddity to occur in an external appearance, such as an unnatural wrinkle occurring in accompaniment to an operation of the robot. Because of this, the outer skin is preferably caused to fit an outer face of the robot closely. Also, it is desirable that an operation of covering the robot with the outer skin is easy.

The invention having been completed based on a recognition of the heretofore described problem, one object thereof is to provide an outer skin structure appropriate for a robot.

Solution to Problem

An aspect of the invention is a robot including an outer skin with which a main body is covered. The outer skin includes an engagement portion that engages with the main body by the main body being covered therewith, an extended portion that extends from the engagement portion, and an attachment member, formed of a hard material, attached to the extended portion so as to extend in a width direction. The outer skin is fixed to the main body by the attachment member being fixed to the main body.

Another aspect of the invention is also a robot including an outer skin with which a main body is covered. A recessed fitting portion is provided extended along an outer face of the main body. A fitting member of a form complementing the recessed fitting portion is provided on the outer skin. The outer skin is fixed to the main body by the fitting member being fitted into the recessed fitting portion.

Still another aspect of the invention is an outer skin with which a main body of a robot is covered. A fitting member of a form complementing a recessed fitting portion provided extended along an outer face of the main body is provided, and the fitting member is fixed to the main body by being fitted into the recessed fitting portion.

According to the invention, an outer skin structure appropriate for a robot can be provided.

BRIEF DESCRIPTION OF DRAWINGS

FIG. 9A is a right side view, FIG. 9B is a front view, and FIG. 9C is a back view, each representing a state wherein the outer skin is removed from the robot.

FIG. 12 is a cut view of a base material.

FIGS. 15A, 15B, 15C and 15D show a process of attaching the outer skin to the main body frame.

FIG. 20A is a right side view, FIG. 20B is a front view, and FIG. 20C is a back view, each representing a state wherein the outer skin is removed from a robot according to another modified example.

FIG. 21A is a right side view, FIG. 21B is a front view, and FIG. 21C is a back view, each representing only the outer skin.

FIG. 22A is a right side view, FIG. 22B is a front view, and FIG. 22C is a back view, each representing a state wherein the outer skin is mounted on the robot.

DESCRIPTION OF EMBODIMENTS

Figure 1A:
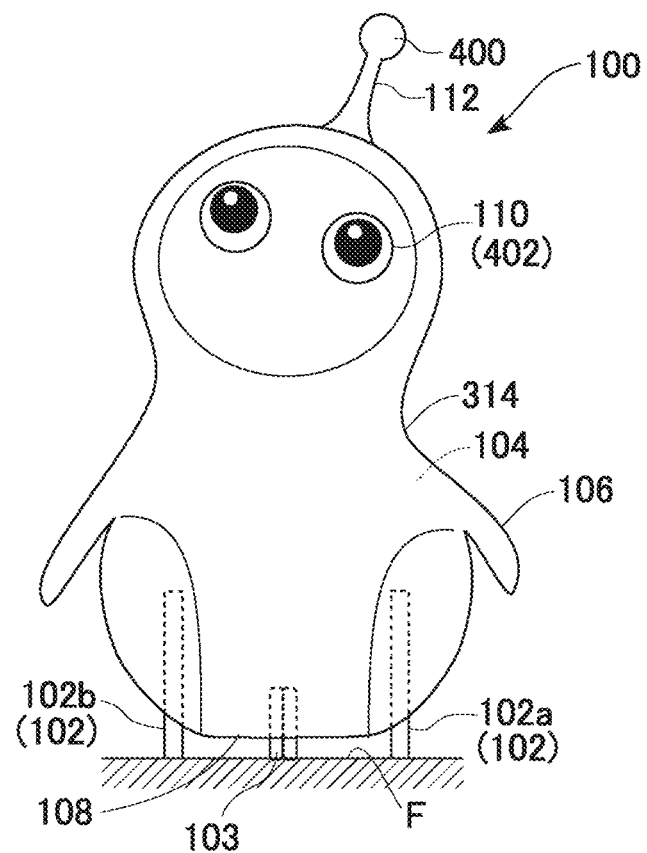
FIG. 1A is a front view representing an external view of a robot according to an embodiment.

Hereafter, an embodiment of the invention will be described in detail, with reference to the drawings. For the sake of convenience, a positional relationship between structures may be expressed with a state shown in the drawings as a reference in the following description. Also, in the following embodiment and modified examples thereof, the same reference signs are allotted to components that are practically identical, and a description thereof is omitted as appropriate.

Figure 1B:
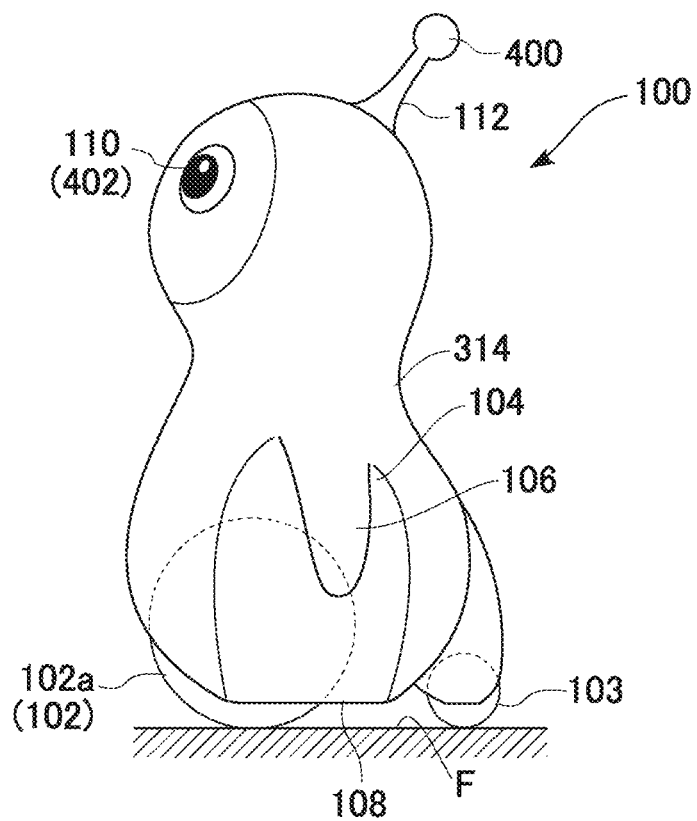
FIG. 1B is a side view representing the external view of the robot according to the embodiment.

FIGS. 1A and 1B are drawings representing an external view of a robot 100 according to the embodiment. FIG. 1A is a front view, and FIG. 1B is a side view.

The robot 100 is an autonomously acting robot that determines an action or a gesture based on an external environment and an internal state. The external environment is recognized using various kinds of sensor, such as a camera or a thermosensor. The internal state is quantified as various parameters that express emotions of the robot 100.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin 314 formed of a soft material having elasticity. The robot 100 may be clothed. By the body 104, which is rounded, soft, and pleasant to touch, being adopted, the robot 100 provides a user with a sense of security and a pleasant tactile sensation. Details of the outer skin 314 and an attachment structure thereof will be described in detail hereafter.

A total weight of the robot 100 is 15 kilograms or less, preferably 10 kilograms or less, and still more preferably 5 kilograms or less. A height of the robot 100 is 1.2 meters or less, or preferably 0.7 meters or less. A user can hold the robot 100 with an effort practically equivalent to that of holding a very young baby.

The robot 100 includes three wheels for three-wheeled traveling. As shown in the drawing, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism and a linking mechanism) to be described hereafter. A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F.

The robot 100 has two arms 106. The arms 106 do not have a function of gripping an object. The arms 106 are capable of performing simple actions such as raising, waving, and oscillating. The two arms 106 can also be individually controlled.

Two eyes 110 are provided in a head portion front surface (a face) of the robot 100. A high resolution camera 402 is incorporated in the eye 110. The eye 110 is also capable of an image display using a liquid crystal element or an organic EL element. The robot 100 incorporates a speaker, and is also capable of simple speech. A horn 112 is attached to an apex portion of the robot 100.

An omnidirectional camera 400 (a first camera) is incorporated in the horn 112 of the robot 100 of the embodiment. The omnidirectional camera 400 can film in all directions up and down and left and right (360 degrees: in particular, practically all regions above the robot 100) at one time using a fisheye lens. The high resolution camera 402 (a second camera) incorporated in the eye 110 can film only in a direction in front of the robot 100. A filming range of the omnidirectional camera 400 is wide, but resolution is lower than that of the high resolution camera 402.

In addition to this, the robot 100 incorporates various sensors, such as a temperature sensor (thermosensor) that converts a peripheral temperature distribution into an image, a microphone array having a multiple of microphones, a form measuring sensor (depth sensor) that can measure a form of a measurement target, and an ultrasonic wave sensor.

Figure 2:
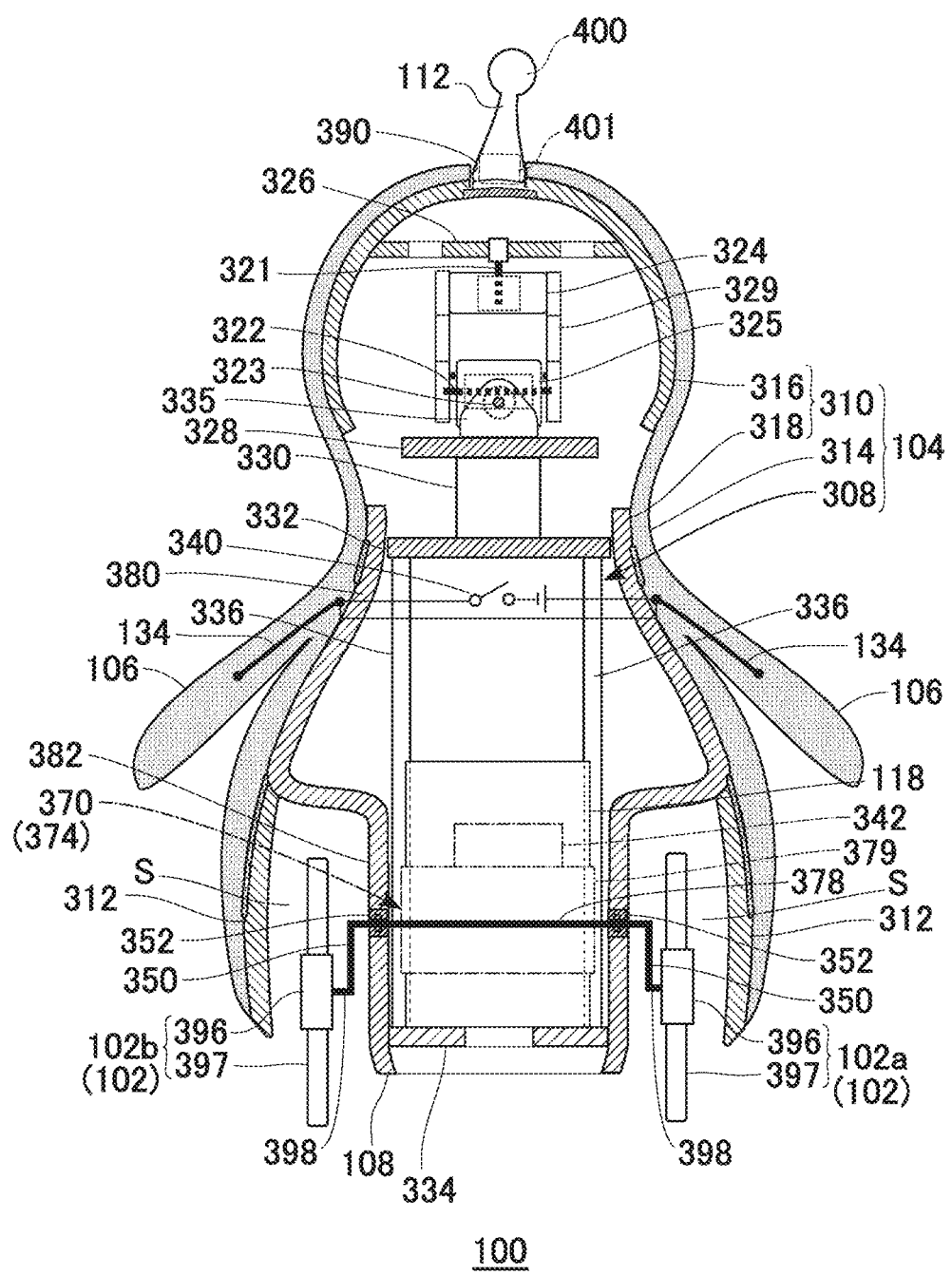
FIG. 2 is a sectional view schematically representing a structure of the robot.
Figure 3:
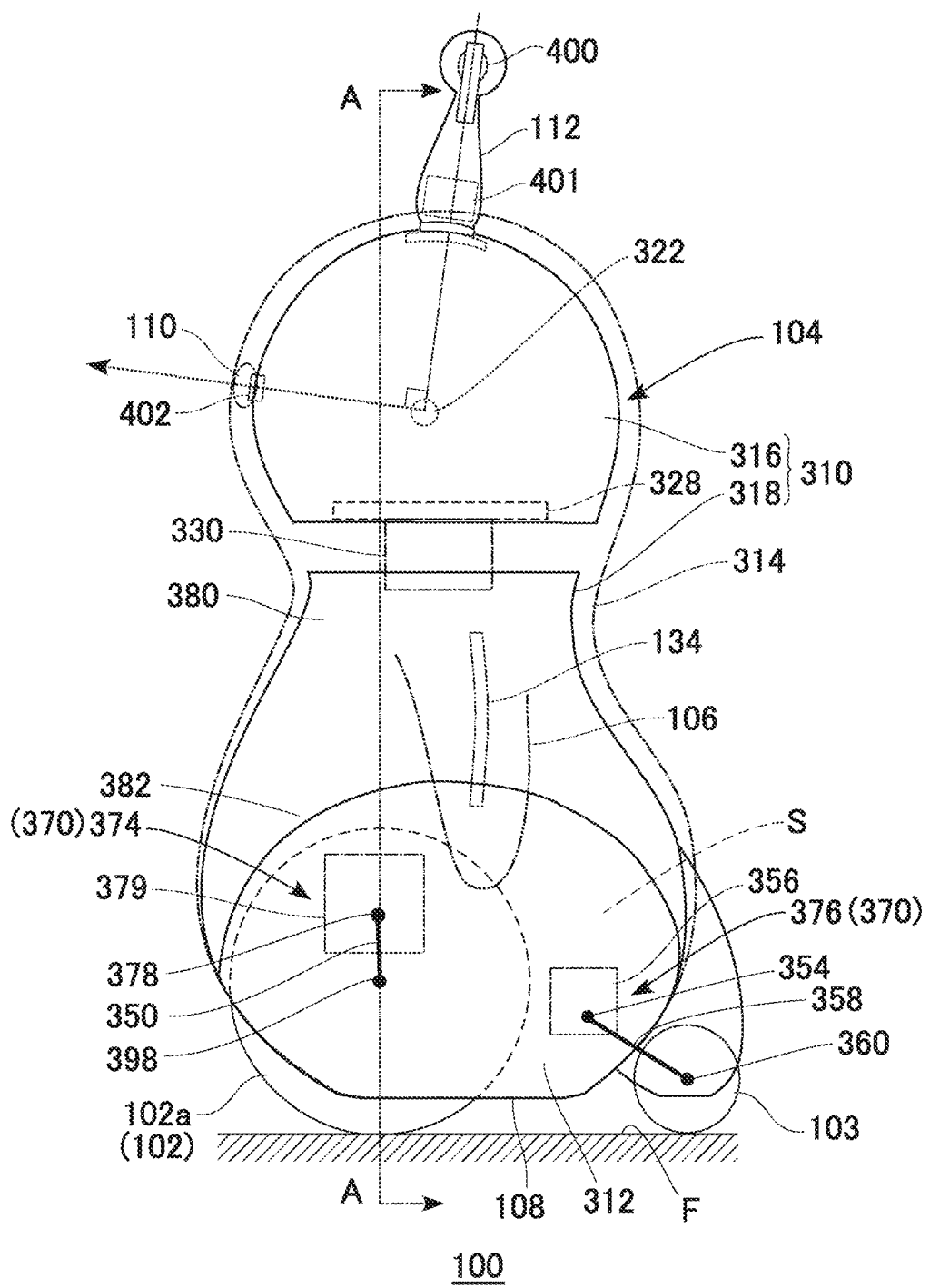
FIG. 3 is a side view representing a structure of the robot centered on a frame.

FIG. 2 is a sectional view schematically representing a structure of the robot 100. FIG. 3 is a side view representing the structure of the robot 100 centered on a frame. FIG. 2 corresponds to a section seen along an A-A arrow of FIG. 3.

As shown in FIG. 2, the body 104 of the robot 100 includes a base frame 308, a main body frame 310, a pair of wheel covers 312, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation can be carried out. A battery 118, a control circuit 342, and various kinds of actuator and the like are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is connected to the upper plate 332 via the internal mechanism, a joint 330, and the like, and attached so as to be relatively displaceable with respect to the trunk portion frame 318.

Three shafts, those being a yaw shaft 321, a pitch shaft 322, and a roll shaft 323, and actuators 324 and 325 that drive each shaft so as to rotate, are provided in the head portion frame 316. The actuator 324 includes a servo motor for driving the yaw shaft 321. The actuator 325 includes a multiple of servo motors for driving each of the pitch shaft 322 and the roll shaft 323. The yaw shaft 321 is driven for a head shaking action, the pitch shaft 322 is driven for a nodding action, a looking up action, and a looking down action, and the roll shaft 323 is driven for a head tilting action. A plate 326 supported by the yaw shaft 321 is fixed to an upper portion of the head portion frame 316.

A base plate 328 made of metal is provided so as to support the head portion frame 316 and an internal mechanism thereof from below. The base plate 328 is linked to the upper plate 332 (the base frame 308) via the joint 330. A support base 335 is provided on the base plate 328, and the actuators 324 and 325 and a crosslink mechanism 329 (a pantagraph mechanism) are supported by the support base 335. The crosslink mechanism 329 links the actuators 324 and 325 vertically, and can cause an interval between the actuators 324 and 325 to change.

More specifically, the roll shaft 323 of the actuator 325 is linked to the support base 335 via a gear mechanism omitted from the drawings. The pitch shaft 322 of the actuator 325 is linked to a lower end portion of the crosslink mechanism 329. Meanwhile, the actuator 324 is fixed to an upper end portion of the crosslink mechanism 329. The yaw shaft 321 of the actuator 324 is linked to the plate 326. A rotary drive mechanism, omitted from the drawings, for driving the crosslink mechanism 329 so as to extend and contract is provided in the actuator 325.

According to this kind of configuration, the actuator 325 and the head portion frame 316 can be caused to rotate (roll) integrally by causing the roll shaft 323 to rotate, whereby an action of tilting the head can be realized. Also, the crosslink mechanism 329 and the head portion frame 316 can be caused to rotate (pitch) integrally by causing the pitch shaft 322 to rotate, whereby a nodding action and the like can be realized. The plate 326 and the head portion frame 316 can be caused to rotate (yaw) integrally by causing the yaw shaft 321 to rotate, whereby an action of shaking the head can be realized. Furthermore, an action of extending and contracting the neck can be realized by causing the crosslink mechanism 329 to extend and contract.

The trunk portion frame 318 houses the base frame 308 and a wheel drive mechanism 370. As shown in FIG. 3, the wheel drive mechanism 370 includes a front wheel drive mechanism 374 and a rear wheel drive mechanism 376. An upper half portion 380 of the trunk portion frame 318 is of a smooth curved form so as to provide an outline of the body 104 with roundness. The upper half portion 380 is formed so as to become gradually narrower toward an upper portion corresponding to a neck portion. A lower half portion 382 of the trunk portion frame 318 is of a small width in order to form a housing space S of the front wheel 102 between the front wheel 102 and the wheel cover 312. A boundary of the upper half portion 380 and the lower half portion 382 is of a stepped form.

Left and right side walls configuring the lower half portion 382, parallel to each other, are penetrated by a pivot shaft 378, to be described hereafter, of the front wheel drive mechanism 374, and support the pivot shaft 378. The lower plate 334 is provided so as to close off a lower end aperture portion of the lower half portion 382. In other words, the base frame 308 is fixed to and supported by a lower end portion of the trunk portion frame 318.

The pair of wheel covers 312 are provided so as to cover the lower half portion 382 of the trunk portion frame 318 from left and right. The wheel cover 312 is formed of resin, and is attached so as to form a smooth outer face (curved face) continuous with the upper half portion 380 of the trunk portion frame 318. An upper end portion of the wheel cover 312 is linked along a lower end portion of the upper half portion 380. Because of this, the housing space S, which is opened downward, is formed between the side wall of the lower half portion 382 and the wheel cover 312.

The outer skin 314 is formed of urethane sponge, and covers the main body frame 310 from an outer side. The arms 106 are molded integrally with the outer skin 314. An aperture portion 390 is provided in an upper end portion of the outer skin 314. A lower end portion of the horn 112 is connected to the head portion frame 316 via the aperture portion 390. The horn 112 has a joint mechanism 401 that functions as a joint. When an excessive load is exerted on the horn 112, the load is released by a dislocation action of the joint mechanism 401, whereby damage to the horn 112 is prevented. Also, (a power line 130 and a signal line 132) connected to the control circuit 342 penetrate the joint mechanism 401, and are connected to the omnidirectional camera 400.

The front wheel drive mechanism 374 includes a rotary drive mechanism for causing the front wheel 102 to rotate and a housing operation mechanism for causing the front wheel 102 to enter and withdraw from the housing space S. That is, the front wheel drive mechanism 374 includes the pivot shaft 378 and an actuator 379. The front wheel 102 has a direct drive motor (hereafter written as a "DD motor") 396 in a central portion thereof. The DD motor 396 has an outer rotor structure, a stator is fixed to an axle 398, and a rotor is fixed coaxially to a rim 397 of the front wheel 102. The axle 398 is integrated with the pivot shaft 318 via an arm 350. A bearing 352 through which the pivot shaft 378 penetrates and which supports the pivot shaft 378 so as to be able to pivot is embedded in a lower portion side wall of the trunk portion frame 318. A sealing structure (bearing seal) for hermetically sealing the trunk portion frame 318 inside and outside is provided in the bearing 352. The front wheel 102 can be driven to reciprocate between the housing space S and an exterior by a drive of the actuator 379.

The rear wheel drive mechanism 376 includes a pivot shaft 354 and an actuator 356. Two arms 358 extend from the pivot shaft 354, and an axle 360 is provided integrally with leading ends of the arms 358. The rear wheel 103 is supported so as to be able to rotate by the axle 360. A bearing omitted from the drawings, through which the pivot shaft 354 penetrates and which supports the pivot shaft 354 so as to be able to pivot, is embedded in the lower portion side wall of the trunk portion frame 318. A shaft sealing structure is also provided in the bearing. The rear wheel 103 can be driven to reciprocate between the housing space S and the exterior by a drive of the actuator 356.

When housing the wheels, the actuators 379 and 356 are driven in one direction. At this time, the arm 350 pivots centered on the pivot shaft 378, and the front wheel 102 rises from the floor surface F. Also, the arm 358 pivots centered on the pivot shaft 354, and the rear wheel 103 rises from the floor surface F. Because of this, the body 104 descends, and the seating face 108 is grounded at the floor surface F.

Because of this, a state in which the robot 100 is sitting is realized. By the actuators 379 and 356 being driven in the opposite direction, each wheel is caused to advance out of the housing space S, whereby the robot 100 can be caused to stand.

A drive mechanism for driving the arm 106 includes a wire 134 embedded in the outer skin 314, and a drive circuit 340 (energizing circuit) of the wire 134. The wire 134 is formed of a shape memory alloy line in the embodiment, contracts and hardens when heated, and relaxes and lengthens when allowed to cool. Leads drawn out from both ends of the wire 134 are connected to the drive circuit 340. When a switch of the drive circuit 340 is activated, the wire 134 (shape memory alloy line) is energized.

The wire 134 is molded or woven in so as to extend from the outer skin 314 to the arm 106. Leads are drawn from both ends of the wire 134 into the trunk portion frame 318. One wire 134 may be provided in each of a left and right of the outer skin 314, or a multiple of the wire 134 may be provided in parallel in each of the left and right of the outer skin 314. The arm 106 can be raised by energizing the wire 134, and the arm 106 can be lowered by interrupting the energization.

An angle of a line of sight (refer to dotted arrows) of the robot 100 can be adjusted by controlling an angle of rotation of the pitch shaft 322. In the embodiment, for the sake of convenience, a direction of an imaginary straight line passing through the pitch shaft 322 and the eye 110 is taken to be a direction of the line of sight. An optical axis of the high resolution camera 402 coincides with the line of sight. Also, in order to facilitate a computing process to be described hereafter, a straight line joining the omnidirectional camera 400 and pitch shaft 322 and the line of sight are set so as to form a right angle.

The head portion frame 316 is linked to the trunk portion frame 318 via the base plate 328, the joint 330, and the like. As shown in the drawing, a sufficient interval is secured in a vertical direction between the head portion frame 316 and the trunk portion frame 318, because of which a range of movement (range of rotation) of the head portion frame 316 centered on the pitch shaft 322 can be increased. In the embodiment, the range of movement is taken to be 90 degrees, which is 45 degrees each up and down from a state wherein the line of sight is horizontal. That is, a limit value of an angle at which the line of sight of the robot 100 is oriented upward (an angle of looking up) is taken to be 45 degrees, and a limit value of an angle at which the line of sight is oriented downward (an angle of looking down) is also taken to be 45 degrees.

Figure 4:
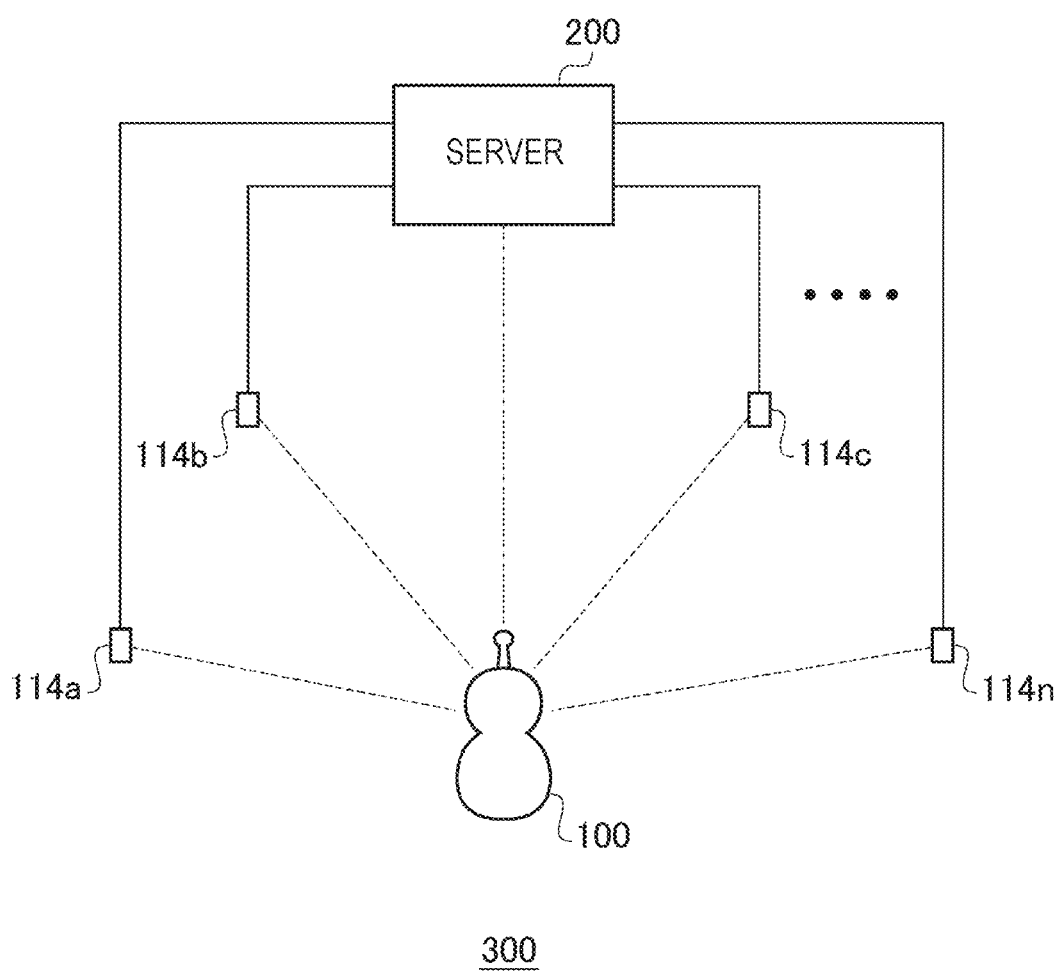
FIG. 4 is a configuration diagram of a robot system.

FIG. 4 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 determines a basic action of the robot 100 based on information obtained from the sensors incorporated in the robot 100 and the multiple of external sensors 114.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Figure 5:
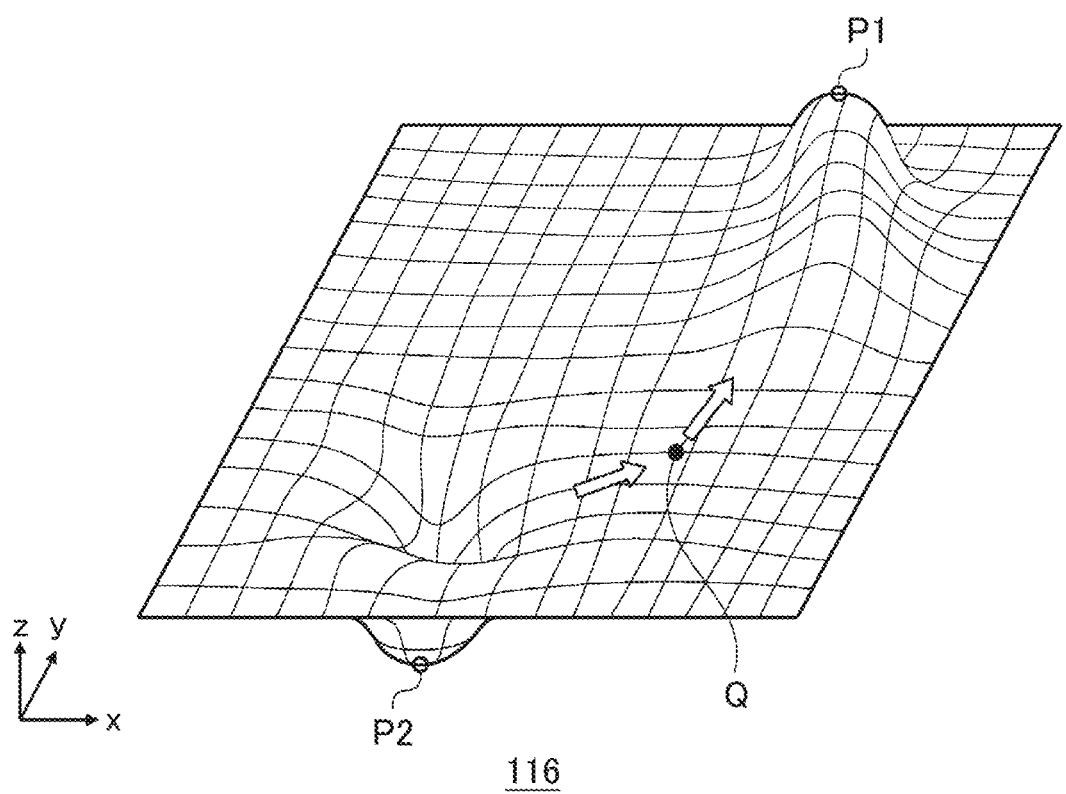
FIG. 5 is a schematic view of an emotion map.

FIG. 5 is a schematic view of an emotion map 116.

The emotion map 116 is a data table stored in the server 200. The robot 100 selects an action in accordance with the emotion map 116. The emotion map 116 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the favored point may be a place where the robot 100 was gently stroked or touched in the past. A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to get wet, like a bathroom or a washroom, an enclosed space or a dark place, a place where the robot 100 has been roughly treated by a user and that invokes an unpleasant memory, or the like. A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies the positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances. When the emotion map 116 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 5. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 has, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 6:
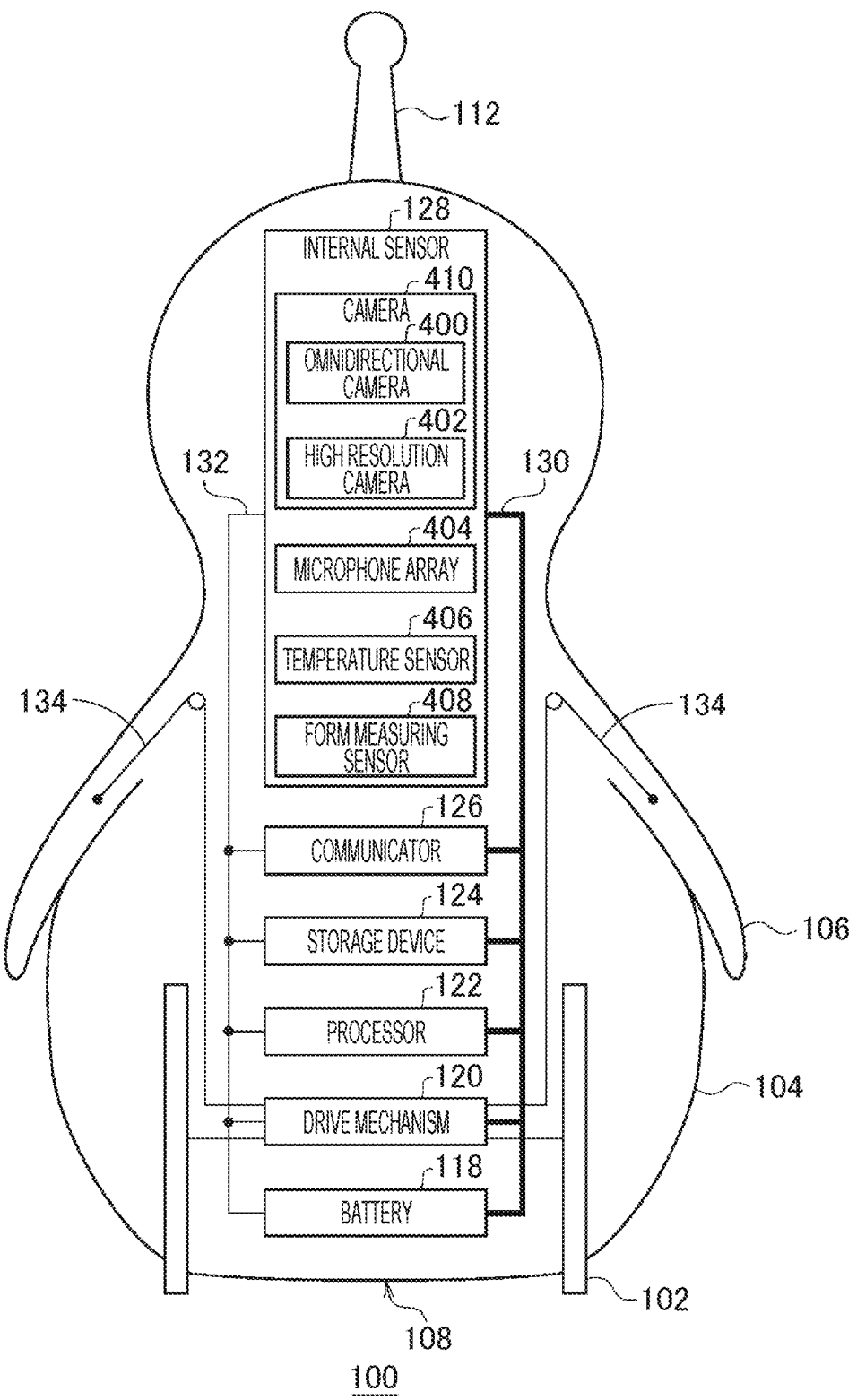
FIG. 6 is a hardware configuration diagram of the robot.

FIG. 6 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described wheel drive mechanism 370. The processor 122 and the storage device 124 are included in the control circuit 342. The units are connected to each other by the power line 130 and the signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera (omnidirectional camera), a microphone array, a distance measuring sensor (infrared sensor), a thermosensor, a touch sensor, an acceleration sensor, a smell sensor, a touch sensor, and the like. The touch sensor is installed between the outer skin 314 and the main body frame 310, and detects a touch by a user. The smell sensor is an already known sensor that applies a principle that electrical resistance changes in accordance with an adsorption of molecules that form a source of a smell.

The communicator 126 is a communication module that carries out wireless communication with the server 200 and various kinds of external device, such as the external sensor 114 or a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls the internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls a wheel (the front wheel 102) and the head portion (the head portion frame 316). The drive mechanism 120 causes a direction of movement and a movement speed of the robot 100 to change by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state. Also, the drive mechanism 120 controls the arm 106 via the wire 134.

Figure 7:
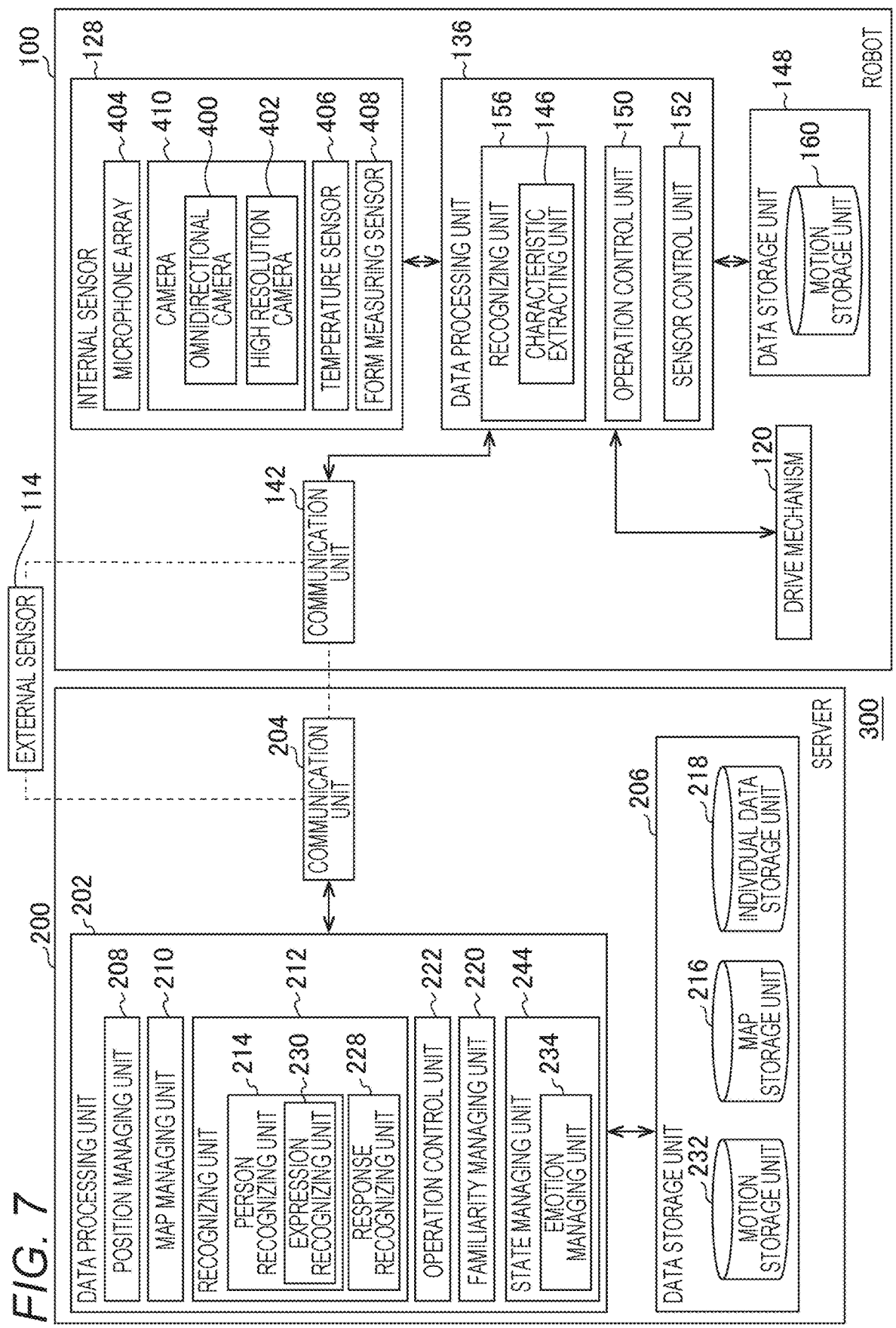
FIG. 7 is a functional block diagram of the robot system.

FIG. 7 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving the arm 106, approaching a user while meandering, and staring at a user with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many motions of the robot 100 are configured as compound motions that include a multiple of unit motions. For example, when the robot 100 approaches an owner, the motion may be expressed as a combination of a unit motion of changing direction toward the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in the motion file. Various motions are expressed by each actuator being controlled together with the passing of time in accordance with the motion file (actuator control information).

Hereafter, settings involved in controlling an action of the robot 100, such as which motion is chosen and when, and output regulation of each actuator when realizing a motion, will collectively be called "action properties". The action properties of the robot 100 are defined by a motion selection algorithm, a motion selection probability, a motion file, and the like.

In addition to a multiple of action maps, the map storage unit 216 also stores a map showing a disposition state of an obstacle such as a chair or a table. The individual data storage unit 218 stores information on a user, and in particular, on an owner. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, a familiarity managing unit 220, and a state managing unit 244. The position managing unit 208 identifies the positional coordinates of the robot 100 using the method described using FIG. 4. The position managing unit 208 may also track positional coordinates of a user in real time.

The state managing unit 244 manages various kinds of internal parameter, such as various kinds of physical state such as a charging rate, an internal temperature, and a processing load of the processor 122. The state managing unit 244 includes an emotion managing unit 234. The emotion managing unit 234 manages various emotion parameters indicating an emotion (loneliness, curiosity, a desire for recognition, and the like) of the robot 100. These emotion parameters are constantly fluctuating. The importance of a multiple of action maps changes in accordance with an emotion parameter, a movement target point of the robot 100 changes in accordance with the action maps, and the emotion parameter changes in accordance with movement of the robot 100 and the passing of time.

For example, when an emotion parameter indicating loneliness is high, the emotion managing unit 234 sets a weighting coefficient of an action map that evaluates a place in which the robot 100 feels at ease to be high. When the robot 100 reaches a point at which loneliness can be eradicated on the action map, the emotion managing unit 234 reduces the emotion parameter indicating loneliness. Also, the various kinds of emotion parameter also change in accordance with a responsive action to be described hereafter. For example, the emotion parameter indicating loneliness decreases when the robot 100 is "hugged" by an owner, and the emotion parameter indicating loneliness increases gradually when the robot 100 does not visually recognize an owner for a long time.

The map managing unit 210 changes the parameters of each coordinate in the multiple of action maps using the method described in connection with FIG. 5. The map managing unit 210 may select one of the multiple of action maps, or may take a weighted average of the z values of the multiple of action maps. For example, the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1. When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 156 of the robot 100 acquires various kinds of environmental information using the internal sensor 128, and transmits the environmental information to the recognizing unit 212 of the server 200 after carrying out a primary processing.

Specifically, the recognizing unit 156 of the robot 100 extracts an image region corresponding to a moving object, particularly a person or an animal, from an image, and extracts a "feature vector" as a collection of feature quantities indicating physical characteristics and behavioral characteristics of the moving object from the extracted image region. A feature vector component (feature quantity) is a numeral wherein various kinds of physical and behavioral characteristic are quantified. For example, a horizontal width of a human eye is quantified in a range of 0 to 1, forming one feature vector component. Already-known facial recognition technology is applied as a method of extracting a feature vector from a filmed image of a person. The robot 100 transmits the feature vector to the server 200.

The recognizing unit 212 of the server 200 further includes a person recognizing unit 214 and a response recognizing unit 228.

The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user. The person recognizing unit 214 also carries out a user identification process on a moving object other than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response. Pleasant and unpleasant actions are distinguished depending on whether a responsive action of a user is pleasant or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 determines a motion of the robot 100 in cooperation with an operation control unit 150 of the robot 100. The operation control unit 222 compiles a movement target point of the robot 100, and a movement route for the movement target point, based on a selection of an action map by the map managing unit 210. The operation control unit 222 compiles a multiple of movement routes, and having done so, may select any of the movement routes.

The operation control unit 222 selects a motion of the robot 100 from a multiple of motions of the motion storage unit 232. A selection probability is correlated to each motion for each situation. For example, a selection method such that a motion A is executed with a 20% probability when a pleasant action is performed by an owner, and a motion B is executed with a 5% probability when a temperature reaches 30 degrees or higher, is defined. The movement target point and the movement route are determined by the action map, and the motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 6), and manages a process of communicating with the external sensor 114, the server 200, and another robot 100. The data storage unit 148 stores various kinds of data. The data storage unit 148 corresponds to the storage device 124 (refer to FIG. 6). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

Various kinds of data may also be downloaded from the map storage unit 216 and the individual data storage unit 218 into the data storage unit 148.

The internal sensor 128 is a collection of various kinds of sensor. The internal sensor 128 includes a microphone array 404, a camera 410, a temperature sensor 406, and a form measuring sensor 408. The microphone array 404, being a unit wherein a multiple of microphones are linked together, is a voice sensor that detects sound. It is sufficient that the microphone array 404 is a device that detects sound, and can detect a direction of a source of the sound. The microphone array 404 is incorporated in the head portion frame 316. As distances between a sound source and each microphone do not coincide, variation occurs in sound collection timing. Because of this, a position of the sound source can be identified from a magnitude and a phase of sound at each microphone. The robot 100 can detect a position of a sound source, and in particular a direction of the sound source, using the microphone array 404.

The camera 410 is a device that films the exterior. The camera 410 includes the omnidirectional camera 400 and the high resolution camera 402. The temperature sensor 406 detects a temperature distribution of an external environment, and converts the temperature distribution into an image. The form measuring sensor 408 is an infrared depth sensor that reads a depth, and eventually an uneven form, of a target object by emitting near-infrared rays from a projector, and detecting reflected light of the near-infrared rays using a near-infrared camera.

The data processing unit 136 includes the recognizing unit 156, the operation control unit 150, and a sensor control unit 152. The operation control unit 150 decides a direction of movement of the robot 100 together with the operation control unit 222 of the server 200. A movement based on an action map may be determined by the server 200, and an instantaneous movement such as avoiding an obstacle may be determined by the robot 100. The drive mechanism 120 causes the robot 100 to head toward a movement target point by driving the front wheels 102 in accordance with an instruction from the operation control unit 150.

The operation control unit 150 decides a motion of the robot 100 in cooperation with the operation control unit 222 of the server 200. One portion of motions may be determined by the server 200, and other motions may be determined by the robot 100. Also, a configuration may be such that although the robot 100 determines a motion, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 of the robot 100 decides a direction of movement of the robot 100 together with the operation control unit 222 of the server 200. A movement based on an action map may be determined by the server 200, and an instantaneous movement such as avoiding an obstacle may be determined by the operation control unit 150 of the robot 100. The drive mechanism 120 causes the robot 100 to head toward a movement target point by driving the front wheels 102 in accordance with an instruction from the operation control unit 150.

The operation control unit 150 of the robot 100 instructs the drive mechanism 120 to execute a selected motion. The drive mechanism 120 controls each actuator in accordance with a motion file.

The operation control unit 150 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and the head (the head portion frame 316) in accordance with an instruction from the operation control unit 150.

The sensor control unit 152 controls the internal sensor 128. Specifically, the sensor control unit 152 controls a direction of measurement by the high resolution camera 402, the temperature sensor 406, and the form measuring sensor 408. The direction of measurement by the high resolution camera 402, the temperature sensor 406, and the form measuring sensor 408 mounted in the head portion of the robot 100 changes in accordance with the orientation of the head portion frame 316. The sensor control unit 152 controls a direction of filming by the high resolution camera 402 (that is, the sensor control unit 152 controls movement of the head portion in accordance with the direction of filming). The sensor control unit 152 and the camera 410 function as a "filming unit".

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior using the incorporated omnidirectional camera, and detects a moving object such as a person or a pet. The recognizing unit 156 includes a characteristic extracting unit 146. The characteristic extracting unit 146 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from a smell sensor, an incorporated highly directional microphone, a temperature sensor, and the like. These characteristics are also quantified, forming a feature vector component.

The robot system 300 clusters a user appearing with a high frequency as an "owner" based on physical characteristics and behavioral characteristics obtained from a large amount of image information and other sensing information. For example, when a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created. Although the above is a simple example, the first profile corresponding to a father and the second profile corresponding to a mother are formed using the heretofore described method, and the robot 100 recognizes that there are at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing". A feature vector characterizing the profile is defined for each profile.

It is assumed that the robot 100 newly recognizes a moving object (user) in a state in which this kind of cluster analysis is completed. At this time, the person recognizing unit 214 of the server 200 executes a user identification process based on the feature vector of the new moving object, and determines which profile (cluster) the moving object corresponds to. For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster (profile) by characteristic extraction (cluster analysis) and application to a cluster accompanying characteristic extraction may be executed concurrently.

Of a series of recognition processes including detecting, analyzing, and determining, the recognizing unit 156 of the robot 100 carries out a selection and extraction of information necessary for recognition, and an analyzing process such as determining is executed by the recognizing unit 212 of the server 200. The recognition processes may be carried out by the recognizing unit 212 of the server 200 alone, or carried out by the recognizing unit 156 of the robot 100 alone, or the two may execute the recognition processes while dividing roles, as heretofore described.

When a strong force is applied to the robot 100, the recognizing unit 156 recognizes this using the incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 recognizes that a "touching action" has been performed by a user, and when upward acceleration is detected in a state in which touching is recognized, the response recognizing unit 228 recognizes that a "hug" has been performed. Physical contact when a user picks up the body 104 may also be sensed, and a hug may also be recognized by a load acting on the front wheels 102 decreasing. To summarize, the robot 100 acquires an action of a user as physical information using the internal sensor 128, the response recognizing unit 228 of the server 200 determines whether the action is pleasant or unpleasant, and the recognizing unit 212 of the server 200 executes a user identification process based on the feature vector.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

The familiarity managing unit 220 of the server 200 changes the familiarity toward a user in accordance with a responsive action recognized by the recognizing unit 156. In principle, the familiarity toward a user who carries out a pleasant action increases, while the familiarity toward a user who carries out an unpleasant action decreases.

Familiarity toward a moving object (user) changes in accordance with what kind of action the robot 100 is subjected to by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Next, the outer skin 314 and an attachment structure thereof will be described.

Figure 8A:
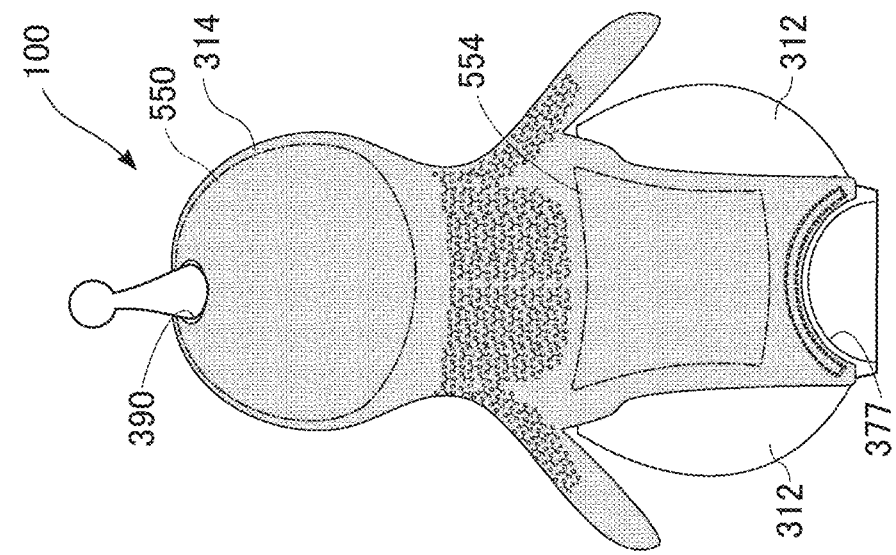
FIG. 8A is a right side view.
Figure 8B:
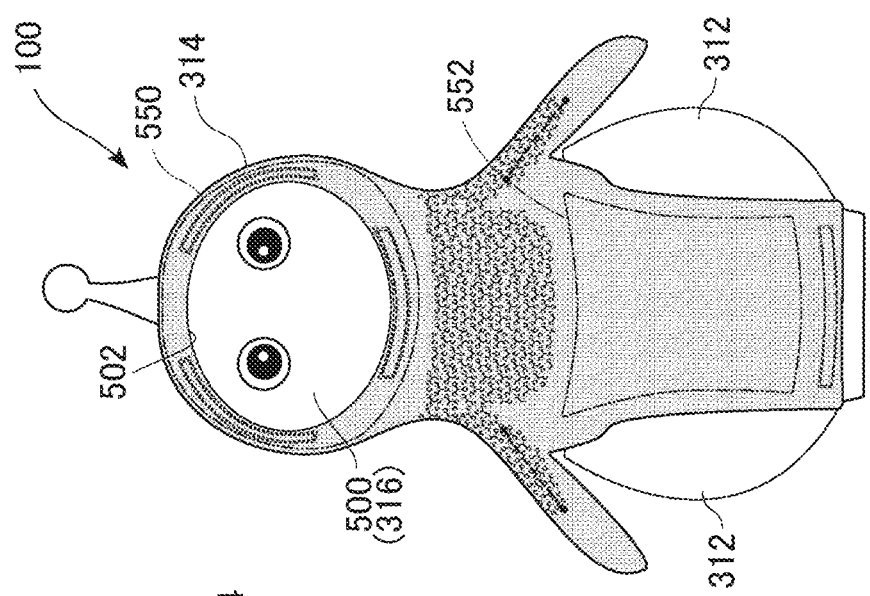
FIG. 8B is a front view.
Figure 8C:
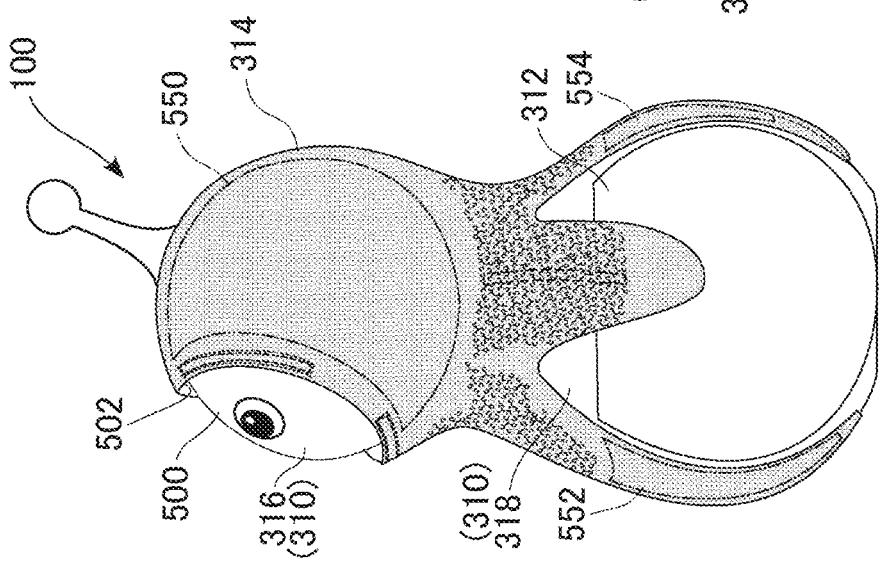
FIG. 8C is a back view, each representing a state wherein an outer skin is mounted on the robot.
Figure 10A:
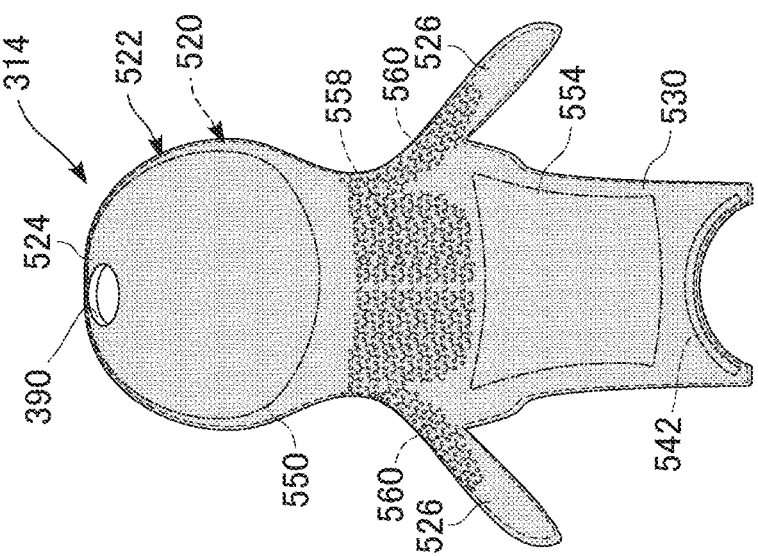
FIG. 10A is a right side view.
Figure 10B:
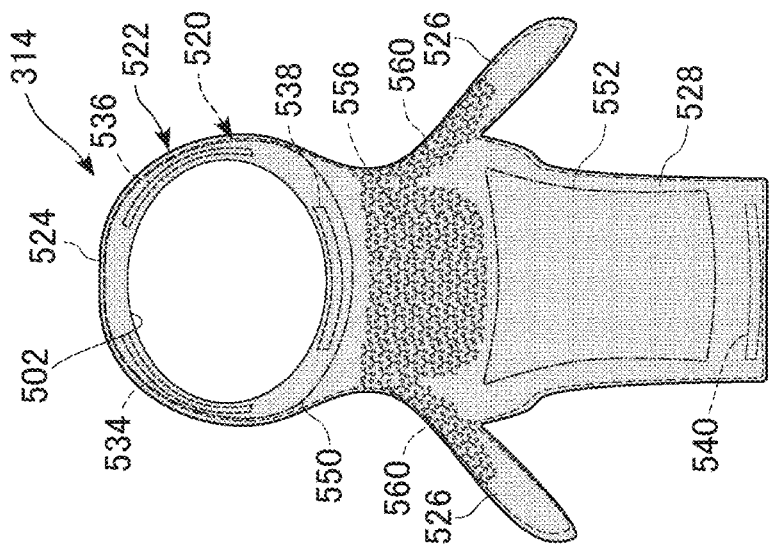
FIG. 10B is a front view.
Figure 10C:
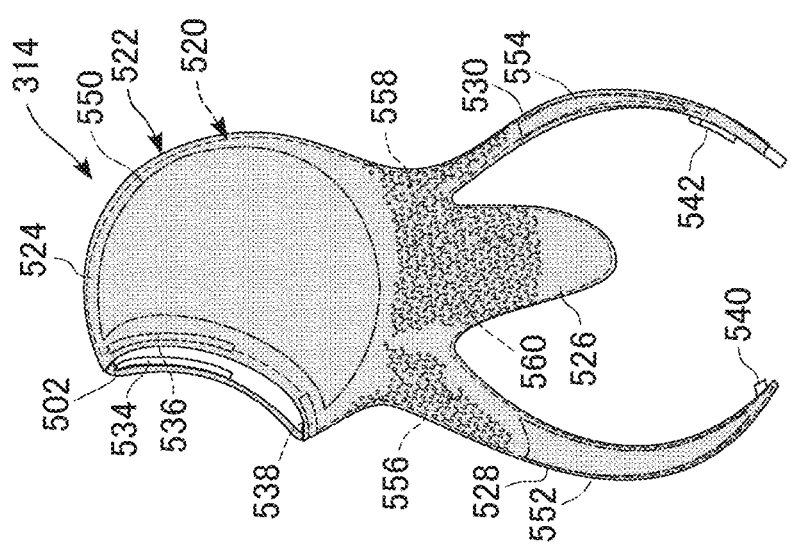
FIG. 10C is a back view, each representing only the outer skin.

FIGS. 8A to 8C are drawings representing a state wherein the outer skin 314 is mounted on the robot 100. FIGS. 9A to 9C are drawings representing a state wherein the outer skin 314 is removed from the robot 100. FIGS. 10A to 10C are drawings representing only the outer skin 314. In each drawing, FIGS. 8A, 9A and 10A are right side views, FIGS. 8B, 9B and 10 B are front views, and FIGS. 8C, 9C and 10C are back views. The external appearance of the robot 100 practically has bilateral symmetry.

As shown in FIGS. 8A to 8C, the outer skin 314 is mounted so as to cover the main body frame 310. A circular aperture portion 502 for exposing a facial region 500 of the head portion frame 316 is provided in an upper front face of the outer skin 314. The outer skin 314 extends to a front face side and a back face side of the robot 100, and is also fixed to the trunk portion frame 318. In the embodiment, the wheel cover 312 is exposed, but this may be covered by the outer skin 314. The outer skin 314 is fixed to the main body frame 310 using a fitting structure to be described hereafter. In the embodiment, the trunk portion frame 318 (more specifically, a front face portion and a back face portion thereof) corresponds to a "first region", and the head portion frame 316 corresponds to a "second region". Also, the main body frame 310 corresponds to a "main body", and the facial region 500 corresponds to an "exposed portion".

As shown in FIGS. 9A to 9C, a multiple of fitting grooves for partially fitting the outer skin 314 in are provided in each of the head portion frame 316 and the trunk portion frame 318. That is, arc form fitting grooves 504, 506, and 508 are provided so as to enclose the facial region 500 in the front face of the head portion frame 316. Meanwhile, an elongated fitting groove 510 is provided in a front face lower portion of the trunk portion frame 318, and an arc form fitting groove 512 is provided in a back face lower end portion. A housing port 377 for housing the rear wheel 103 is provided in a back face lower portion of the trunk portion frame 318, and the fitting groove 512 is formed in a periphery of the housing port 377. The fitting grooves 504 to 512 function as "recessed fitting portions".

As shown in FIGS. 10A to 10C, the outer skin 314 is configured by a base material 520 having elasticity being housed in a fabric bag 522, and is formed of a soft material that feels good to touch all over. The fabric bag 522 is such that a fabric material smooth to the touch, such as polyester, is sewn into a bag form, and a non-woven fabric (non-woven fabric) is provided on an inner side of a face that forms an outer side when mounted on the robot 100. By the non-woven fabric being sandwiched between the base material 520 and the fabric bag 522, a tactile sensation softer and smoother than when not sandwiching a non-woven fabric is realized. The outer skin 314 includes a bag form portion 524 covering the head portion frame 316, a pair of arm portions 526 extending downward from left and right side faces of the bag form portion 524, an extended portion 528 extending downward from a front face of the bag form portion 524, and an extended portion 530 extending downward from a back face of the bag form portion 524. In the embodiment, the fabric bag 522 corresponds to a "cover sheet" that covers the base material 520. Also, the extended portion 528 corresponds to a "first extended portion", and the extended portion 530 corresponds to a "second extended portion".

By covering the head portion frame 316, the bag form portion 524 functions as an "engagement portion" that engages with the main body frame 310. The aperture portion 502 is formed in the front face of the bag form portion 524, and the aperture portion 390 is formed in an apex portion. Arc form fitting members 534, 536, and 538 are provided on an inner face of the bag form portion 524 so as to enclose the aperture portion 502. Meanwhile, an elongated fitting member 540 is provided on a lower portion inner face of the extended portion 528, and an arc form fitting member 542 is provided on a lower portion inner face of the extended portion 530. The fitting members 534 to 542 are provided along a peripheral edge portion of the outer skin 314, and function as "attachment members" for fixing the outer skin 314 to the main body frame 310.

The fitting members 534 to 538 have complementary shapes with the fitting grooves 504 to 508 of the head portion frame 316 respectively. The fitting members 540 and 542 have complementary shapes with the fitting grooves 510 and 512 of the trunk portion frame 318 respectively. The fitting members 534 to 542 are formed of a hard material such as a resin, and the outer skin 314 is fixed to the main body frame 310 by the fitting members 534 to 542 being fitted into the fitting grooves 504 to 512 respectively. Details of the fixing structure will be described hereafter.

Returning to FIGS. 8A to 8C, when the main body frame 310 is covered with the outer skin 314, a contact region (close contact region) is created between the two. A head portion contact region 550, an abdominal portion contact region 552, and a back portion contact region 554 are shown in the same drawing. The main body frame 310 and the outer skin 314 are in close contact with each other in these contact regions. However, as the head portion frame 316 pivots, extends, and contracts with respect to the trunk portion frame 318, a three-dimensional transformation occurs among the contact regions of the outer skin 314. In other words, because the contact regions exist, distortion is liable to occur among the contact regions. In the embodiment, an increased elasticity region, wherein the elasticity of the base material 520 is partially increased, is provided among the contact regions of the outer skin 314 in order that no impedance to an operation of the robot 100 occurs even when this kind of distortion occurs. The increased elasticity region is set in a portion subjected to considerable tensile stress, compressive stress, torsional stress, or shearing stress in accompaniment to an operation of the robot 100.

That is, as shown in FIGS. 10A to 10C, an increased elasticity region 556 is provided between the head portion contact region 550 and the abdominal portion contact region 552 in the base material 520, and an increased elasticity region 558 is provided between the head portion contact region 550 and the back portion contact region 554. The outer skin 314 is in close contact with each of the head portion frame 316 and the trunk portion frame 318 in a position distanced from an increased elasticity region. Also, extension and contraction accompanying an operation of the arm 106 is also needed in the arm portion 526, because of which an increased elasticity region 560 is provided. A specific configuration for realizing the increased elasticity regions will be described in detail hereafter.

Figure 11A:
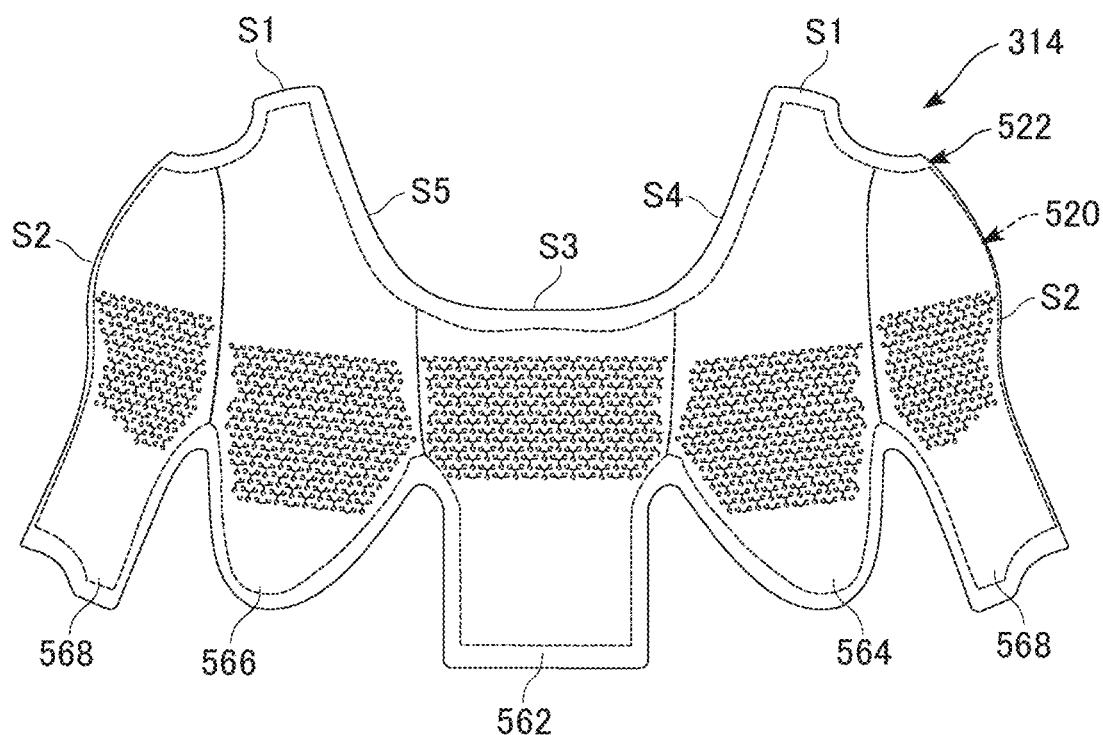
FIG. 11A and FIG. 11B are exploded view of an outer skin.
Figure 11B:
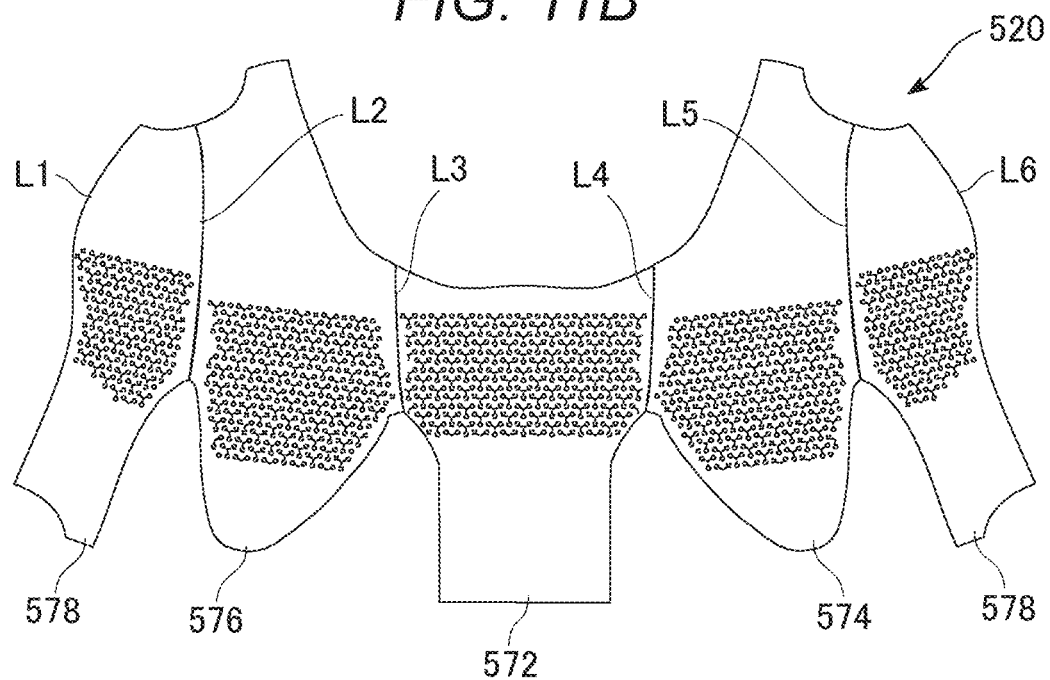
Figure 13A:
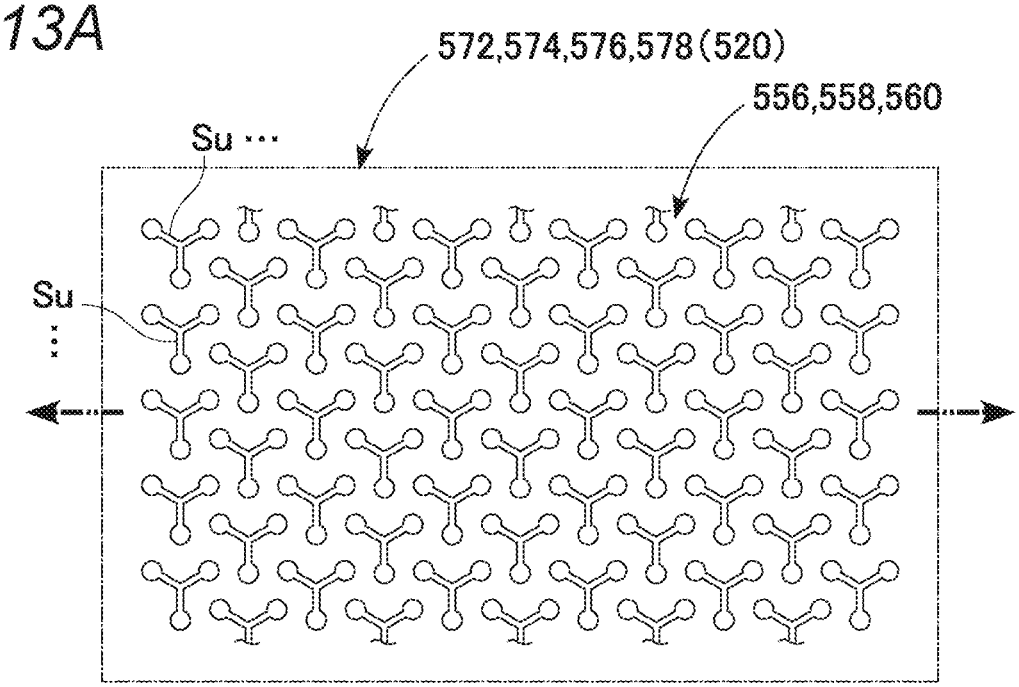
FIG. 13A, FIG. 13B and FIG. 13C are partial expanded views showing an increased elasticity region in the base material.
Figure 13B:
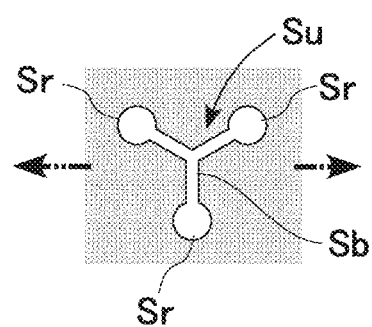
Figure 13C:
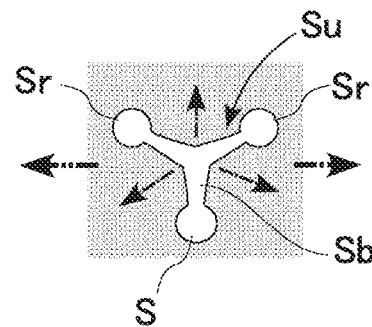
Figure 14:
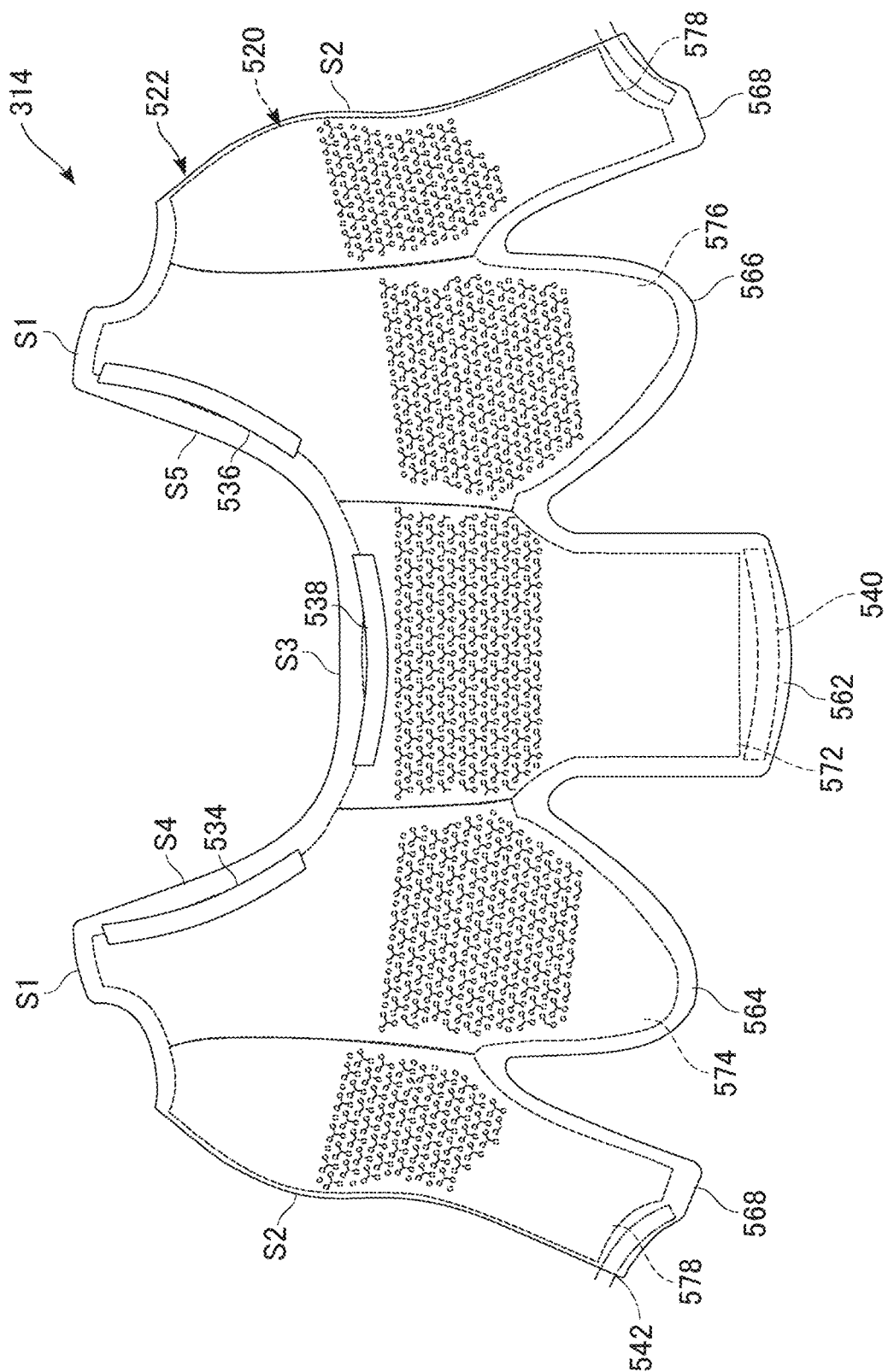
FIG. 14 is a drawing representing a back face (inner face) of the outer skin.

FIGS. 11A and 11B are exploded views of the outer skin 314. FIG. 11A shows a state wherein the outer skin 314 is exploded along a specific cutting line, and FIG. 11B shows an exploded state of the base material 520 corresponding to FIG. 11A. FIG. 12 is a cut view of the base material 520. FIGS. 13A to 13C are a partial expanded views showing an increased elasticity region in the base material 520. FIG. 13A shows one portion of the increased elasticity region, FIG. 13B shows an aperture unit configuring the increased elasticity region, and FIG. 13C shows a state wherein tensile force has acted on the aperture unit. FIG. 14 is a drawing representing a back face (inner face) of the outer skin 314.

As shown in FIG. 11A, the outer skin 314 is configured by the base material 520 being housed in the fabric bag 522, whose external form is practically the same (a similar form). The outer skin 314 has a front face corresponding portion 562, a right side face corresponding portion 564, a left side face corresponding portion 566, and back face corresponding portions 568 and 568. The front face corresponding portion 562 covers a trunk portion front face of the robot 100. The back face corresponding portion 568 covers a trunk portion back face of the robot 100. The right side face corresponding portion 564 and the left side face corresponding portion 566 form the pair of arms 106. The bag form portion 524 is formed of an upper portion of each corresponding portion.

The outer skin 314 shown in FIGS. 10A to 10C are formed by connecting apex edges S1 of the right side face corresponding portion 564 and the left side face corresponding portion 566, and connecting end edges S2 of the pair of back face corresponding portions 568. At this time, the aperture portion 502 is formed by a top edge S3 of the front face corresponding portion 562, a top edge S4 of the right side face corresponding portion 564, and a top edge S5 of the left side face corresponding portion 566. In the example shown in the drawing, the back face corresponding portion 568 is divided into two, but the division position not being limited to this, division may be carried out at a boundary between any two neighboring corresponding portions.

As shown in FIG. 11B, the base material 520 has a front face corresponding region 572 to be housed in the front face corresponding portion 562, a right side face corresponding region 574 to be housed in the right side face corresponding portion 564, a left side face corresponding region 576 to be housed in the left side face corresponding portion 566, and a pair of back face corresponding regions 578 to be housed in the pair of back face corresponding portions 568. Boundary lines L1 to L6 correspond to cutting lines when compiling the base material 520. In the example shown in the drawing, the back face corresponding region is divided into two, but the division position not being limited to this, division may be carried out at a boundary between any two neighboring corresponding regions. The base material 520 is formed slightly on the small side in consideration of transformation of the base material 520. This means that when the outer skin 314 is mounted on the main body frame 310, the outer skin 314 is in close contact with the external form of the main body frame 310, and has an attractive external appearance.

As shown in FIG. 12, each corresponding region of the base material 520 is obtained by a base material sheet 570 formed of a porous foam material being cut along the cutting lines shown in the drawing. An open cell type is employed as the porous foam material. In the embodiment, the base material sheet 570 is formed of urethane sponge, but the base material sheet 570 may be fabricated from another material having elasticity. The increased elasticity regions 556 to 560 are formed in advance in respective corresponding regions of the base material sheet 570 by a hole opening process (a punching process) using a press.

Each increased elasticity region is configured by a large number of apertures being optimally disposed in each corresponding region. In the embodiment, aperture units Su of a predetermined sectional form are regularly disposed vertically and horizontally in each corresponding region, as shown in FIG. 13A. Each aperture unit Su penetrates each corresponding region in a thickness direction of the base material 520. In the embodiment, the aperture unit Su is of a Y-form in cross-section. As shown in FIG. 13B, the aperture unit Su has a circular hole Sr in three leading end portions of a cut Sb of the Y form (trifurcated form). A diameter of the circular hole Sr is greater than a width of the cut Sb.

This kind of configuration is such that even when tensile force (refer to a two-dot chain line arrow) occurs in the base material 520 due to an operation of the robot 100, each aperture unit Su spreads in three directions from a center thereof, as shown in FIG. 13C, whereby each corresponding region extends (refer to a one-dot chain line arrow), and can absorb the tensile force. As shown in FIG. 13A, the aperture unit Su is such that a cut is inclined obliquely with respect to a direction of pull. In other words, a cut is angled so as to be sheared obliquely by a pull in, for example, a horizontal direction. Also, a distribution angle of the large number of aperture units Su is inclined obliquely with respect to the direction of pull. Also, owing to apertures being provided, force needed for transformation is less than when no aperture is provided. As a result of this, torque needed to drive the head portion frame 316 can be reduced. Also, owing to apertures being provided in the base material 520, wrinkles (a wavy state) accompanying a transformation are unlikely to occur.

As shown in FIG. 14, the fitting members 534 to 542 are disposed on a back side (inner side) of the outer skin 314. The fitting members 534 to 538 are affixed or sewn slightly inward of the top edges S3 to S5 of the outer skin 314. The fitting member 540 is housed in the fabric bag 522 in a position in a vicinity of a lower end of the front face corresponding portion 562. The fitting member 542 is housed in the fabric bag 522 in a position in a vicinity of a lower end of each of the two back face corresponding portions 568 so as to straddle the back face corresponding portions 568.

Figure 16A:
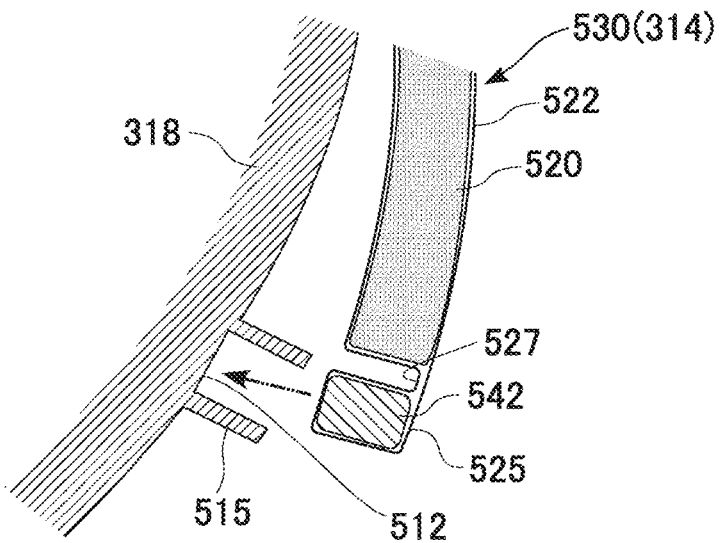
FIGS. 16A and 16B are enlarged views of a B portion of FIG. 15C, and are representing a method of fixing the outer skin.
Figure 16B:
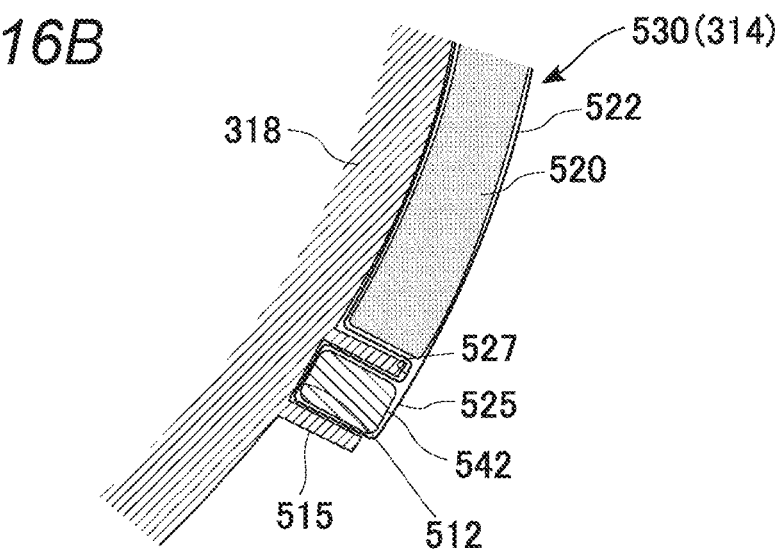

FIGS. 15A to 15D are drawings representing a method of attaching the outer skin 314. FIGS. 15A to 15D show a process of attaching the outer skin 314 to the main body frame 310. FIGS. 16A and 16B are enlarged views of a B portion of FIG. 15C, and is a drawing representing a method of fixing the outer skin 314. FIG. 16A shows a state before fixing, and FIG. 16B shows a fixed state.

Attachment of the outer skin 314 is carried out using the following procedure. Firstly, as shown in FIG. 15A, the main body frame 310 is covered from above with the outer skin 314. At this time, as shown in FIG. 15B, the head portion frame 316 is inserted into the bag form portion 524 with an interval between the extended portion 528 and the extended portion 530 in a slightly widened state.

After the head portion frame 316 is housed in the bag form portion 524 in this way, the fitting members 534 to 538 are fitted into the fitting grooves 504 to 508 respectively. When the state shown in FIG. 15C is reached, a contact portion between the head portion frame 316 and the bag form portion 524 forms a fulcrum, and tension in a direction of extension of the extended portions 528 and 530 can be applied. By the fitting members 540 and 542 being fitted into the fitting grooves 510 and 512 respectively in a state wherein tension is applied to the two extended portions, the outer skin 314 can be fixed to the main body frame 310, as shown in FIG. 15D.

As shown in FIG. 16A, a housing portion 525 is formed across a narrow portion (constricted portion) of a leading end portion of the fabric bag 522 in the extended portion 530, and the fitting member 542 is housed in the housing portion 525. That is, the fitting member 542 is in a state of being sewn into the leading end portion of the fabric bag 522 and sealed off, and the base material 520 and the fitting member 542 are separated with the narrow portion as a boundary. The narrow portion forms a recessed portion 527 on an inner face side of the fabric bag 522.

Meanwhile, the fitting groove 512 is formed in a rib 515 formed on an outer face of the trunk portion frame 318. When fixing the extended portion 530 to the trunk portion frame 318, the fitting member 542, which is in a state of being housed in the housing portion 525, is fitted into the fitting groove 512 (refer to a two-dot chain line arrow). At this time, as shown in FIG. 16B, an upper side wall of the rib 515 attains an aspect of entering the recessed portion 527, whereby the fitting member 542 and the fitting groove 512 are securely fitted. As the fitting member 542 is locked in the direction of extension of the extended portion 530 by the fitting groove 512 (the rib 515), an appropriate amount of tension can continue to be applied to the outer skin 314. A fitting structure of the fitting member 540 and the fitting groove 510 is the same as that of the fitting member 542 and the fitting groove 512, and an attachment structure of the extended portion 528 is the same as that of the extended portion 530.

According to this kind of attachment structure, the head portion contact region 550 of the outer skin 314 can be brought into close contact with the head portion frame 316, and the abdominal portion contact region 552 and the back portion contact region 554 can be brought into close contact with the trunk portion frame 318. As the fitting member 542 extends over practically the whole width of a peripheral edge portion of the extended portion 530, and the fitting member 54 also extends over practically the whole width of a peripheral edge portion of the extended portion 528, there is no occurrence of a localized stress concentration when attaching the outer skin 314, and deterioration and damage of the fabric bag 522 can be prevented.

Heretofore, the robot 100 and an outer skin structure thereof have been described based on an embodiment. According to the embodiment, a soft and pleasant tactile sensation can be provided when a user touches or hugs the robot 100 by the outer skin 314 being configured of a flexible material with some thickness. Also, by including the outer skin 314, the robot 100 can be protected from a shock such as a fall or a violent collision. Also, when a person and the robot 100 unintentionally collide too, a shock to which the person is subjected is alleviated by including the soft outer skin 314.

When mounting the outer skin 314 on the main body frame 310, an appropriate tension can be applied to the extended portions 528 and 530, with the bag form portion 524 covering the head portion frame 316 as a fulcrum. Further, the tension can be maintained by the fitting members 540 and 542 provided in the two extended portions being fitted into the fitting grooves 510 and 512 of the trunk portion frame 318. In particular, the fitting members and the fitting grooves are provided with a comparatively large width, and have a certain amount of length in a direction perpendicular to the direction of extension of the two extended portions, because of which tension is easily applied evenly over the whole of the extended portions. Owing to the tension, the outer skin 314 can be provided with an appropriate sensation of fitting with respect to the main body frame 310. In particular, the whole of the outer skin 314 can be caused to fit the main body frame 310 by the fitting members 534 to 542 being disposed along the peripheral edge portion of the outer skin. Because of this, the outer skin 314 transforming unnaturally when the robot 100 operates can be prevented or restricted, and the outer skin 314 can be caused to appear natural as one portion of the robot 100. According to this kind of fitting structure, the outer skin 314 can be mounted in an appropriate state in an appropriate position on the robot 100. Because of this, the robot 100 driving each portion with the outer skin 314 still improperly mounted can be prevented. That is, an unexpected load being exerted on the robot 100 due to improper mounting of the outer skin 314 can be prevented.

Also, according to the embodiment, mounting of the outer skin 314 can be completed by an easy operation of simply covering the head portion frame 316 with the bag form portion 524, and fitting the fitting members 534 to 542 to the trunk portion frame 318. Because of this, a user can easily mount and remove the outer skin 314, meaning that when the outer skin 314 becomes dirty, the user can maintain cleanliness by replacing and laundering by him or herself.

Also, according to the embodiment, increased elasticity regions are provided among contact regions of the head portion and the trunk portion of the robot 100 in the base material 520 of the outer skin 314. Because of this, an increase in operating torque can be restricted while maintaining the fitting sensation of the outer skin 314, even when the robot 100 moves the head portion. Also, by an increased elasticity region extending and contracting well in response to a displacement of the head portion, wrinkles occurring in the outer skin 314 can be restricted. As the base material 520 itself is formed of a porous foam material, the base material 520 has a constant elasticity overall, but the elasticity is further increased in an increased elasticity region, whereby elasticity characteristics of the outer skin 314, which take movable portions of the robot 100 into consideration, can be optimized. Furthermore, apertures, a large number of apertures which are disposed in the base material 520, can be rendered unnoticeable by the base material 520 being housed in the fabric bag 522. As a result of this, an external appearance of the robot 100 with no incongruity can be maintained.

MODIFIED EXAMPLES

One example of a form of the aperture unit Su, and a disposition configuration thereof, is presented in the heretofore described embodiment. In a modified example, a configuration differing from this can be employed.

FIGS. 17A to 17D and FIGS. 18A to 18D are drawings representing aspects of apertures formed in a base material of an outer skin according to modified examples. FIGS. 17A to 17D show first to fourth modified examples, and FIGS. 18A to 18D show fifth to eighth modified examples.

Figure 17A:
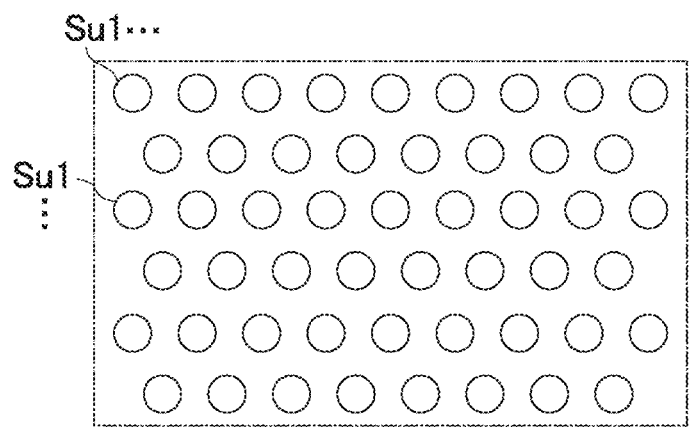
FIGS. 17A, 17B, 17C and 17D show first to fourth modified examples representing aspects of apertures formed in a base material of an outer skin according to modified examples.
Figure 17B:
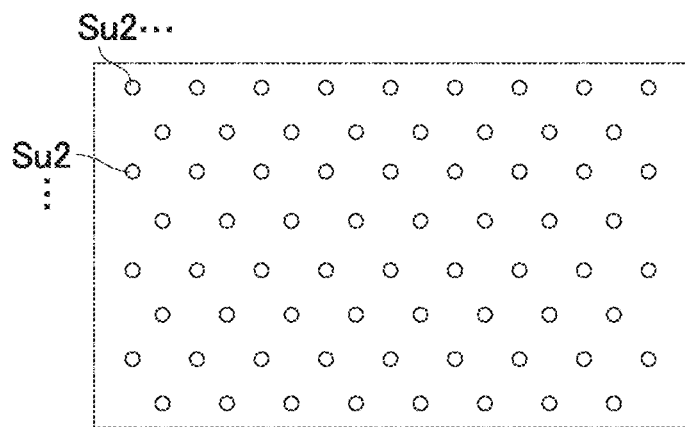

In the first modified example, an aperture unit Su1 is formed of a comparatively large circular hole (FIG. 17A). In the second modified example, an aperture unit Su2 is formed of a comparatively small circular hole (FIG. 17B). These modified examples are such that although there is a difference in the sizes of the circular holes, the circular form itself widens little, because of which obtaining a sufficient stretching in the base material is difficult in comparison with the heretofore described embodiment. However, as the base material is configured of a porous foam material, a certain advantage can be expected owing to a synergistic effect between the material itself and the apertures.

Figure 17C:
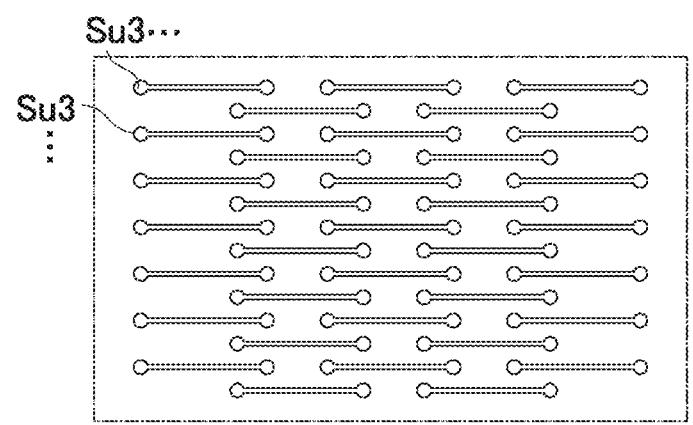
Figure 17D:
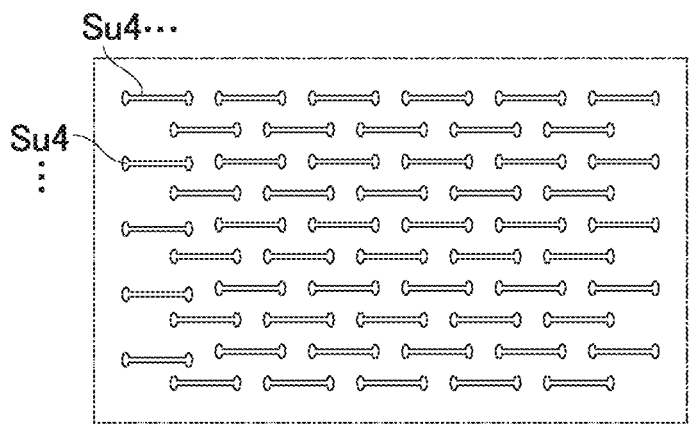

In the third modified example, an aperture unit Su3 is formed of a comparatively long linear cut, and a circular hole provided at either end of the cut (FIG. 17C). In the fourth modified example, an aperture unit Su4 is formed of a comparatively short linear cut, and a circular hole provided at either end of the cut (FIG. 17D). In these modified examples, the base material stretches easily in a direction vertical to the cut, but stretches little in a direction along the cut. Consequently, one-directional orientation appears in the elasticity of the base material, and depending on the direction of pull of the outer skin, there is a possibility that the force of the pull cannot be sufficiently absorbed.

Figure 18A:
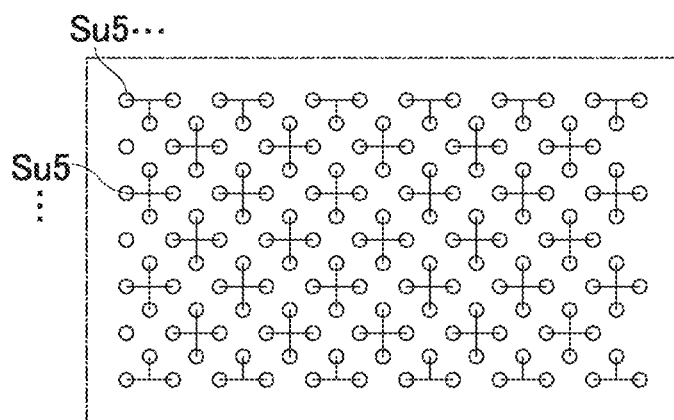
FIGS. 18A, 18B, 18C and 18D show fifth to eighth modified examples representing aspects of apertures formed in a base material of an outer skin according to modified examples.
Figure 18B:
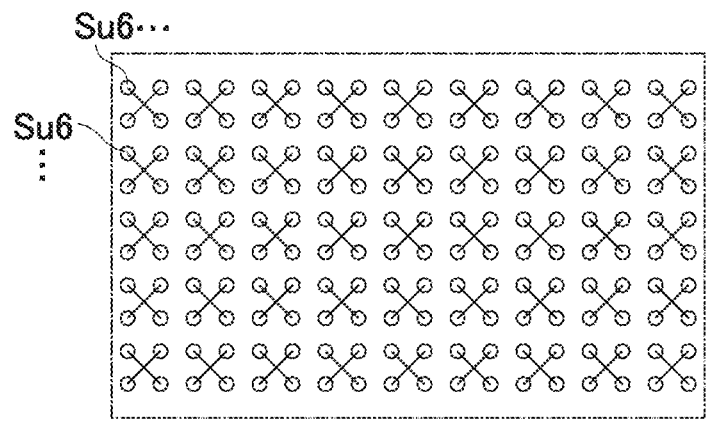

In the fifth modified example, an aperture unit Su5 is formed of cross-form cuts, and circular holes are provided at leading ends of the cuts (FIG. 18A). In the sixth modified example, an aperture unit Su6 is formed of X-form cuts, and circular holes are provided at leading ends of the cuts (FIG. 18B). In these modified examples, the aperture unit is formed by two cuts intersecting at right angles. With an intersection point of the two cuts as a center of the aperture unit, radial cuts are formed as an overall form. With regard to the elasticity of the base material, elasticity in vertical and horizontal directions is promoted according to the fifth modified example, and elasticity in oblique directions of 45 degrees and 135 degrees is promoted according to the sixth modified example. Note that two-directional orientation appears in both cases.

Figure 18C:
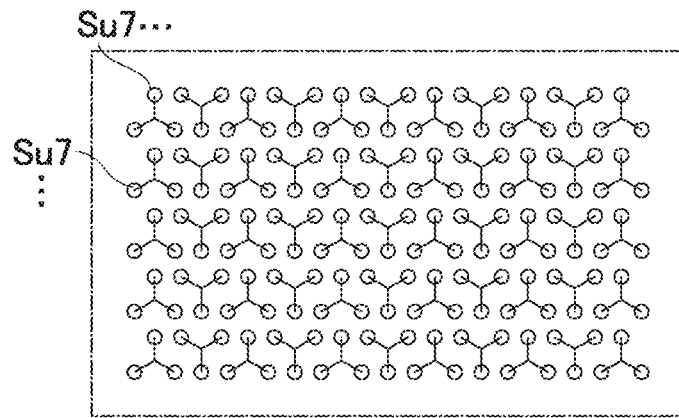

In the seventh modified example, an aperture unit Su7 is formed of Y-form (trifurcated form) cuts, and circular holes are provided at leading ends of the cuts (FIG. 18C). Orientations of the Y-form of the aperture unit Su7 are reversed in lines neighboring horizontally. Further, a large number of the aperture unit Su7 are disposed arrayed vertically and horizontally in the base material. According to this kind of configuration, vertical and horizontal tensile stress exerted on the base material can be dispersed in three directions in each aperture unit Su7. That is, an amount of freedom regarding a direction in which the cut opens is increased, even in comparison with the fifth and sixth modified examples.

Figure 18D:
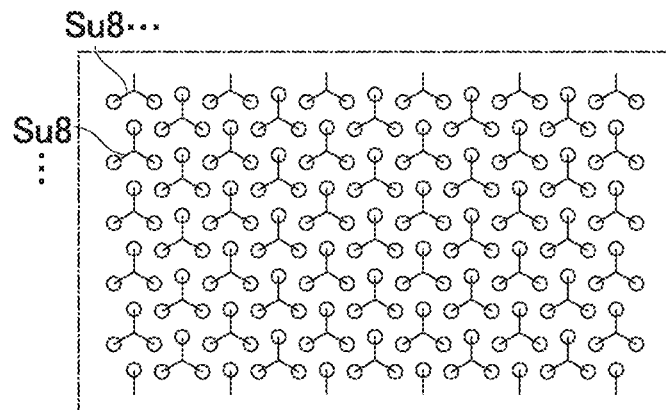

In the eighth modified example, the same configuration as in the seventh modified example is employed as an aperture unit Su8, but with regard to an arrangement of the aperture unit Su8, neighboring lines are disposed in a form staggered in a vertical direction (FIG. 18D). Because of this, the arrangement of the aperture unit Su8 forms an oblique angle with respect to vertical and horizontal tensile stress exerted on the base material, and the tensile stress can be dispersed in three directions over the base material as a whole.

Among the heretofore described first to eighth modified examples, it can be said that the eighth modified example has the highest amount of freedom of base material elasticity. The heretofore described embodiment is such that the width of the cuts in the eighth modified example is increased (refer to FIGS. 13A to 13C). Because of this, friction between opposing faces of the cuts when the outer skin 314 is twisted is restricted, and elasticity is further increased.

As heretofore described, various forms can be employed for an aperture unit provided in a base material. Regarding the form of an aperture unit, it is sufficient that an optimum form is employed based on an expected displacement direction. In the case of the robot 100 of the embodiment, pivoting and elasticity are combined for a large amount of freedom, because of which it is good when there is a large amount of freedom in the elasticity direction, and employing the kind of radial cuts of the embodiment and the modified example shown in FIGS. 18A to 18D are preferable. Furthermore, regarding the distribution of the aperture units, the aperture units are preferably disposed somewhat staggered, as in the embodiment and the eighth modified example, rather than being arrayed vertically and horizontally as in the fifth to seventh modified examples.

Also, a structure wherein a fitting member is attached as an "attachment member" to an extended portion of an outer skin, and fitted into a fitting groove of a main body frame, is presented as an example in the embodiment. In a modified example, instead of this kind of fitting structure, a configuration wherein an attachment member having a predetermined width attached to an extended portion is hooked onto an end portion of a main body frame may be adopted. Alternatively, an attachment member may be fixed to a main body frame using a separate member such as a screw or a hook.

Figure 19A:
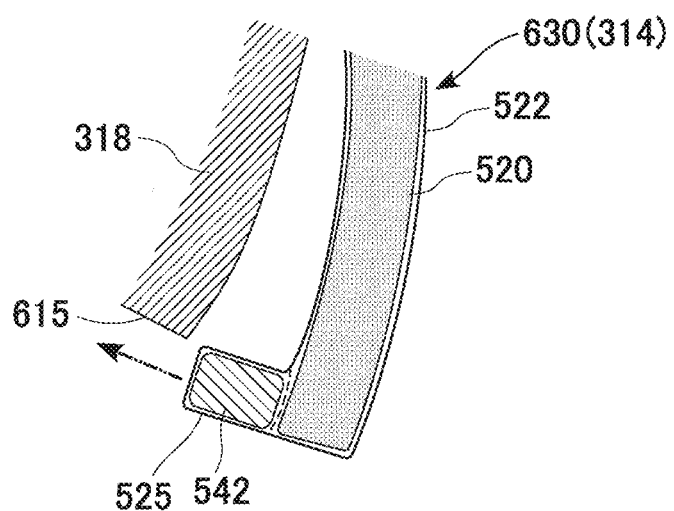
FIGS. 19A and 19B are drawings representing a method of fixing the outer skin according to another modified example.
Figure 19B:
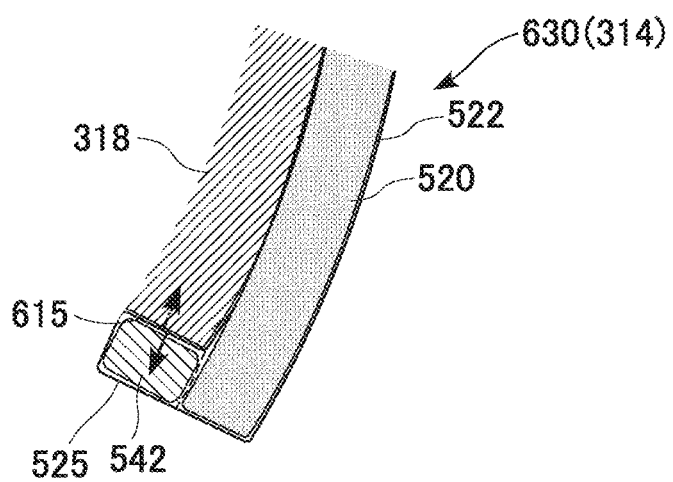

FIGS. 19A and 19B are drawings representing a method of fixing the outer skin 314 according to another modified example. FIG. 19A shows a state before fixing, and FIG. 19B shows a fixed state. In the modified example, as shown in FIG. 19A, the housing portion 525 is formed on a leading end portion inner side of the fabric bag 522 in an extended portion 630, and the fitting member 542 is housed therein. That is, the fitting member 542 is in a sealed state on the leading end portion inner side of the fabric bag 522. When fixing the extended portion 630 to the trunk portion frame 318, the fitting member 542, which is in a state of being housed in the housing portion 525, is hooked onto a lower end portion 615 of the trunk portion frame 318 (refer to a two-dot chain line arrow). That is, the fitting member 542 is caused to lock to the trunk portion frame 318 in an aspect that is not an uneven fitting.

At this time, as shown in FIG. 19B, an inner side of a corner portion formed by the fitting member 542 and the base material 520 is hooked onto a lower end corner portion of the trunk portion frame 318, and an appropriate contact force acts between the fitting member 542 and the trunk portion frame 318 (refer to a one-dot chain line arrow). Because of this, in the same way as in the embodiment, an appropriate tension can be applied in a direction of extension of the extended portion 630.

The invention not being limited to the heretofore described embodiment and modified examples, components can be modified and embodied without departing from the scope of the invention. Various inventions may be formed by combining a plurality of components disclosed in the heretofore described embodiment and modified examples as appropriate. Also, some components from among all components presented in the heretofore described embodiment and modified examples may be omitted.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 6 can also be comprehensively understood as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

An example wherein a contact region in which an outer skin is in close contact is provided in each of a head portion and a trunk portion of a robot, and an increased elasticity region is provided between the two contact regions in a base material, is presented in the heretofore described embodiment. In a modified example, a contact region (close contact region) in which an outer skin is in close contact may be provided in each of a trunk portion and an arm portion of a robot, and an increased elasticity region may be provided between the two contact regions in a base material. Specifically, an arm portion frame configuring an arm of a robot may be provided in addition to the configuration of the heretofore described embodiment. Further, the outer skin may be brought into close contact with each of a trunk portion frame and the arm portion frame, and aperture units may be distributed in a base material portion positioned between the two frames.

The aperture units presented in the heretofore described embodiment and modified examples being no more than examples, an aperture unit of a form and size differing from these aperture units may be employed. For example, radial aperture units extending in five directions, six directions, or more than six directions from a center may be employed, and an increased elasticity region may be formed by distributing the aperture units.

An example wherein a form and size of a large number of aperture units are of one kind is presented in the heretofore described embodiment and modified examples. In a modified example, multiple kinds of aperture unit of differing sizes and forms may be set as aperture units, and the aperture units may be disposed appropriately in an increased elasticity region. For example, the aperture unit of the heretofore described embodiment and the aperture unit of any one of the first to eighth modified examples may be disposed in combination. Alternatively, the aperture units of any multiple of the first to eighth modified examples may be disposed in combination.

A configuration wherein the bag form portion 524 is provided in the outer skin 314, and caused to engage by covering the head portion frame 316 therewith, is presented as an example in the heretofore described embodiment. In a modified example, a portion of an outer skin that is not of a bag form may be caused to engage by hooking the portion onto a predetermined place (an end portion or the like) on a main body frame, and tension may be applied to an extended portion with the engagement portion as a fulcrum. The "engagement portion" may include various structures, such as a fitting structure or a hooking structure. It is sufficient that a "bag form portion" is of a structure that engages with a specific region (one portion) of a robot by the specific region being covered with the bag form portion, and is supported by the specific region.

In the heretofore described embodiment, a fitting member is formed of a hard material, but as there is no need for the fitting member to be hard provided that the fitting member does not fall out of a fitting groove, the fitting member may be, for example, an elastic member such as rubber or the like.

In the heretofore described embodiment, a base material of an outer skin is formed of a urethane sponge, but another sponge, such as a rubber sponge, may be employed. A rubber sponge can be obtained by, for example, kneading a foaming agent, a softening agent, or the like, into rubber and vulcanizing.

In the heretofore described embodiment, the outer skin 314 is formed of a soft material, but the outer skin 314 may be formed of, for example, a resin material, or the like, capable of a certain amount of elastic transformation. An attachment member may be attached in a position distanced from a peripheral edge portion of an outer skin.

In the heretofore described embodiment, as shown in FIG. 14, the fitting members 534 to 538 are attached to an inner face of an outer skin, and the fitting members 540 and 542 are housed in an end portion of the outer skin. That is, a configuration wherein the fitting members 534 to 538 are attached to a surface of the fabric bag 522, and the fitting members 540 and 542 are housed in the fabric bag 522, is shown as an example. In a modified example, conversely, the fitting members 534 to 538 may be housed in an outer skin, and the fitting members 540 and 542 may be attached to a surface of the outer skin. Alternatively, all of the fitting members 534 to 542 may be housed in an outer skin, or attached to a surface of the outer skin.

In the heretofore described embodiment, a configuration wherein the facial region 500 is exposed as an exposed portion from the outer skin 314 is presented as an example. In a modified example, for example, a region such as the palm of a hand or the sole of a foot of a robot may be exposed as an "exposed portion". When the robot is a pet robot or the like, a region such as a tail of the robot may be exposed as an "exposed portion".

Although not mentioned in the heretofore described embodiment, an increased elasticity region may be realized by a thickness of a predetermined region of a base material being relatively small. Also, a base material may be configured in a layered form, and a difference may be provided in a thickness direction between an increased elasticity region and another region.

In the heretofore described embodiment, an aperture unit is configured of a cut and a circular hole at a leading end of the cut, but a square hole larger than a width of the cut may be adopted. Chamfering (C chamfering or R chamfering) may be implemented on a corner portion of the square hole. The circular hole or square hole may be omitted depending on a strength of a base material (porous material). By employing a cut rather than a hole, unevenness of the base material can be reduced, and a tactile sensation can be improved.

In the heretofore described embodiment, a configuration wherein a base material is housed in a fabric bag is presented as an example. In a modified example, fabric may be affixed to a surface of a base material.

In the heretofore described embodiment, one example of an aperture unit distribution is shown in FIG. 12, but the distribution can be set as appropriate in accordance with characteristics (elasticity, softness, and the like) of a porous material configuring a base material, a direction of movement and a movement range of a movable portion (a joint and the like) covered by an increased elasticity region, and the like.

Although not mentioned in the heretofore described embodiment, an aperture ratio of an increased elasticity region may be relatively increased by causing kinds of porous foam material to differ between the increased elasticity region and another region. A base material may be configured by combining a material with a relatively large aperture ratio and a material with a relatively small aperture ratio. In this case, a configuration wherein a cut or a hole does not penetrate may be adopted.

Although not mentioned in the heretofore described embodiment, an increased elasticity region in a base material may be formed of a high resilience material (high resilience urethane or the like), and another region may be configured of a low resilience material (low resilience urethane or the like). Alternatively, an increased elasticity region may be formed by stacking a high resilience material and a low resilience material.

Although not mentioned in the heretofore described embodiment, an anti-slip member such as rubber may be provided on an inner face of a contact region in a base material, or an anti-slip coating may be implemented.

Although not mentioned in the heretofore described embodiment, a fitting member may be configured of a magnet, and a fitting groove may be configured of a magnetic member, in the configuration of FIGS. 16A and 16B and the like. By so doing, a fitting state of the fitting member and the fitting groove can be stably maintained.

Although not mentioned in the heretofore described embodiment, a sensor that detects a fitting of a fitting member and a fitting groove may be provided. For example, a magnet may be provided in a fitting member, while a magnetism sensor (non-contact sensor) formed of a Hall element or the like is disposed in a vicinity of a fitting groove, and attachment or detachment of the fitting member and the fitting groove (an existence or otherwise of a fitting) is detected. The robot 100 may determine that the outer skin 314 is mounted using the fitting detection.

Although not mentioned in the heretofore described embodiment or modified examples, an "outer skin" may be understood as a concept including "clothing" of a robot.

Although one aspect of a robot is presented in the heretofore described embodiment and modified examples, the technical concept of the heretofore described outer skin structure can also be applied to another humanoid robot, pet robot, or the like. A "first region" and a "second region" may be set with any connection portion (joint) of a robot as a boundary. Further, a "contact region (close contact region)" for each region may be provided in a base material of an outer skin, and an "increased elasticity region" provided between a contact region of the first region and a contact region of the second region (a connection portion corresponding region and a joint portion corresponding region). The heretofore described outer skin structure can be applied to a finger joint, or the like, in addition to a body (limb) of a robot.

An aperture unit is preferably formed of radial cuts, as in the heretofore described embodiment, and may include V-form, Y-form, or cross-form cuts. When there are six radial directions from a center, it may be understood that two Y-form cuts are included, or that three V-form cuts are included. When there are eight radial directions from a center, it may be understood that two cross-form cuts are included, or that four V-form cuts are included.

In the heretofore described embodiment and modified examples, a base material formed of a porous foam material is employed, but another material having elasticity may be employed. For example, a base material may be formed of an elastic body such as rubber. Note that a soft, porous material such as sponge is preferable in terms of restricting a load for elasticity, and restricting resistance to an operation of the robot.

In the heretofore described embodiment, there is no particular mention of materials of the base material 520 and the fabric bag 522 enveloping the base material 520, but a combination of materials is preferably such that static electricity is unlikely to be generated even there is friction between the base material 520 and the fabric bag 522 in accompaniment to a drive of the robot 100.

FIG. 20A to FIG. 22C are drawings representing an outer skin according to another modified example, and a method of fixing the outer skin. FIGS. 20A to 20C are drawings representing a state wherein the outer skin is removed from a robot. FIGS. 21A to 21C are drawings representing only the outer skin. FIGS. 22A to 22C are drawings representing a state wherein the outer skin is mounted on the robot. In each drawing, FIGS. 20A, 21A and 22A are right side views, 20B, 21B and 22B are front views, and FIGS. 20C, 21C and 22C are back views.

In the modified example, a structure of fixing an outer skin 714 to a main body frame 710 differs from that of the heretofore described embodiment. As shown in FIGS. 20A to 20C, a circular aperture portion 717 is provided in a front face of a head portion frame 716, and a face member 712 is installed. The face member 712 forms a circular plate that complements the aperture portion 717, and a front face of the face member 712 forms a facial region. An annular recessed fitting portion 706 is formed by a gap between the face member 712 and the aperture portion 717. A pair of fitting holes 708 are provided in positions below the face member 712 in the head portion frame 716. The recessed fitting portion 706 and the fitting holes 708 configure a fixing structure for fixing the outer skin 714 to the head portion frame 716.

A pair of projections 720 are provided projecting backward on a lower rear portion of a trunk portion frame 718. The projection 720 is such that a leading end thereof is of a disk form with a somewhat large diameter, and has a form with a button-like appearance. A pair of hook and loop fasteners 722 are provided on a bottom face of the trunk portion frame 718. The projections 720 and the hook and loop fasteners 722 configure a fixing structure for fixing the outer skin 714 to the trunk portion frame 718.

As shown in FIGS. 21A to 21C, the outer skin 714 is configured by an outer skin main body 728 and an elastic mounting portion 730 being sewn together. The outer skin main body 728 is configured by the base material 520 being housed in the fabric bag 522, in the same way as in the heretofore described embodiment. A string threading portion 740 is fabricated by sewing along the aperture portion 502 of the outer skin main body 728. By pulling both ends of a string 742 inserted through the string threading portion 740, the aperture portion 502 can be drawn in to an appropriate size.

Also, a fastener 750 is attached by sewing to the outer skin main body 728 along a portion below the aperture portion 502. The fastener 750 is formed of a hard resin, and is an elongated member having a curvature practically the same as that of a peripheral edge of the face member 712. A pair of projections 752 are provided in an intermediate portion of the fastener 750. The projections 752 can be fitted into the pair of fitting holes 708. As shown in FIG. 21B, the fastener 750 is provided so that an outer diameter side (protruding side) thereof lies along the aperture portion 502. In the embodiment, the pair of fitting holes 708 function as "recessed fitting portions", and the pair of projections 752 (the fastener 750) function as "fitting members".

The elastic mounting portion 730 links the extended portion 528 and the extended portion 530 at the front and back of the outer skin main body 728 at the bottom. The elastic mounting portion 730 is formed of a soft material, in the same way as the outer skin main body 728, and configures a bottom portion of the outer skin 714. Also, the elastic mounting portion 730 may be formed of a soft material (sponge or the like) whose elasticity differs from that of the outer skin main body 728. An aperture portion 731 is provided in the elastic mounting portion 730 in a position corresponding to the housing port 377. A pair of holes 734 are formed in a lower back portion of the elastic mounting portion 730. The hole 734 has a small width form like a buttonhole, but as the elastic mounting portion 730 is soft, the hole 734 can be expanded in a width direction. The pair of projections 720 can be inserted one each through the holes 734. A pair of hook and loop fasteners 732 are provided on an upper face of a bottom portion of the elastic mounting portion 730, and can be mounted one each on the pair of hook and loop fasteners 722.

When attaching the outer skin 714 to the main body frame 710, the head portion frame 716 is inserted from a side portion aperture portion (one of left and right aperture portions enclosed by the outer skin main body 728 and the elastic mounting portion 730) of the outer skin 714. Further, after the head portion frame 716 is housed in the bag form portion 524, the projection 752 is fitted into the fitting hole 708, and the fastener 750 is installed in the head portion frame 716. At this time, the fastener 750 is rolled up over a periphery of the aperture portion 502 toward an interior of the aperture portion 502 from the state shown in FIG. 21B, while inverting the fastener 750 vertically. By so doing, the fastener 750 is rolled inside the fabric bag 522, and is attached so as not to be exposed to the exterior, as shown in FIGS. 22A to 22C. Further, the aperture portion 502 is drawn appropriately by pulling the string 742, and an opened end edge of the aperture portion 502 is fitted into the recessed fitting portion 706. By so doing, as shown in the drawing, the outer skin 714 is securely fixed to the head portion frame 716, and the facial region of the face member 712 can be clearly exposed. In the embodiment, the recessed fitting portion 706 functions as a "recessed fitting portion", and the aperture portion 502 (peripheral edge portion) of the outer skin 714 functions as a "fitting member (fitting portion)".

Continuing, the elastic mounting portion 730 is fixed to the bottom face of the trunk portion frame 718. At this time, the pair of projections 720 are inserted through the corresponding holes 734. After the projection 720 is inserted through the hole 734, the hole 734 attempts to return to the original small width form owing to an elastic force. Because of this, a head portion of the projection 720, being of a button-like aspect, hooks onto a periphery of the hole 734, whereby detachment from the trunk portion frame 718 is prevented. Also, the pair of hook and loop fasteners 732 are attached to the corresponding hook and loop fasteners 722. In this way, the outer skin 714 can be correctly fixed to the main body frame 710.

In the modified example, a configuration wherein a bottom portion of a robot is covered by the outer skin 714 is adopted, and a sitting state after wheels are housed is intentionally unstable. This means that when the robot moves an arm or a head in the sitting state, a body naturally wobbles, whereby the robot can be caused to seem like a living being. Also, the bottom portion of the robot is soft, and a tactile sensation when a user lifts and hugs the robot improves.

In the modified example, a configuration is such that the aperture portion 502 of the outer skin 714 is adjusted to an appropriate size by drawing the string 742, and thereby caused to fit into the recessed fitting portion 706. In another modified example, the periphery of the aperture portion 502 of the outer skin 714 may be fixed into the recessed fitting portion 706 using a binding band or other fixing means. In the modified example, one example of the fastener 750 and a method of fixing the fastener 750 to the outer skin 714 is presented, but another method may be employed. For example, a form other than an arc form may be employed as a fastener form. A structure may be such that a fastener is a divided type, and one portion (a vicinity of the aperture portion 502, or the like) of the outer skin 714 is sandwiched between a first fastener and a second fastener. A structure wherein a fastener is fitted to one portion of the outer skin 714 may also be adopted. A position of a projection provided on a fastener (a face on which a fastener is provided) can be set as appropriate.

A robot of the modified example can also be expressed as follows.

The robot includes an outer skin with which a main body is covered. The outer skin includes an outer skin main body, and an elastic mounting portion formed of a soft material with elasticity. The outer skin main body includes an engagement portion that engages with the main body by covering the main body, and a first extended portion and a second extended portion that extend to mutually opposite sides from the engagement portion. The elastic mounting portion is provided so as to connect the first extended portion and the second extended portion. The main body is housed in a space enclosed by the elastic mounting portion, the first extended portion, and the second extended portion. The outer skin main body may include an attachment member (fitting member) formed of a hard material. The outer skin is fixed to the main body by the attachment member being fixed to the main body.

Figure 23B:
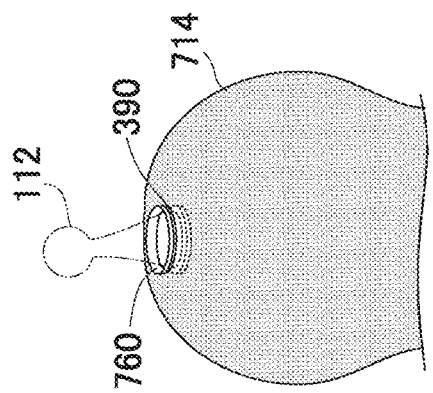
FIGS. 23A and 23B are drawings representing an outer skin, and a method of fixing the outer skin, according to another modified example.
Figure 23A:
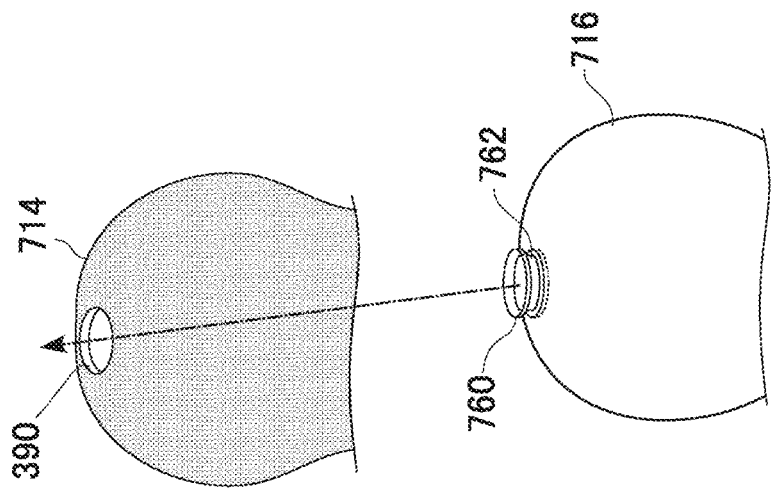

FIGS. 23A and 23B are drawings representing an outer skin, and a method of fixing the outer skin, according to another modified example. FIG. 23A shows a state before attaching a main body frame and the outer skin, and FIG. 23B shows a state wherein the two are attached.

In the modified example, a guide 760 is provided in an apex portion of the head portion frame 716. The guide 760 functions as positioning when fixing the outer skin 714. The guide 760 is of a stepped cylindrical form, and an annular fitting portion 762 is formed along an outer peripheral face. The guide 760 is formed of a resin material having plasticity, and also fulfils a sealing function when the horn 112 is installed in the head portion frame 716. As shown in FIG.

23A, the head portion frame 716 is covered with the outer skin 714 while inserting the guide 760 through the aperture portion 390. Because of this, as shown in FIG. 23B, the aperture portion 390 fits into the fitting portion 762, and the outer skin 714 can be fixed to the head portion frame 716 while being positioned.

According to the modified example, the outer skin 714 can be securely fixed to the apex portion by the guide 760 being provided, and the outer skin 714 can be prevented from interfering with the horn 112. In another modified example, the guide 760 may be provided integrally with the outer skin 714 rather than the head portion frame 716. Further, the outer skin 714 may be installed on the head portion frame 716 while the horn 112 is inserted through the guide 760.

Figure 24A:
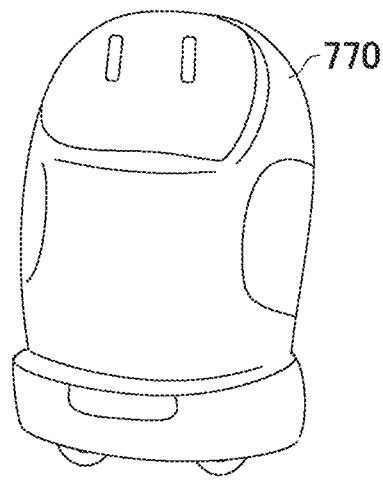
FIGS. 24A, 24B, 24C, 24D, 24E and 24F are drawings representing an outer skin according to other modified examples.
Figure 24D:
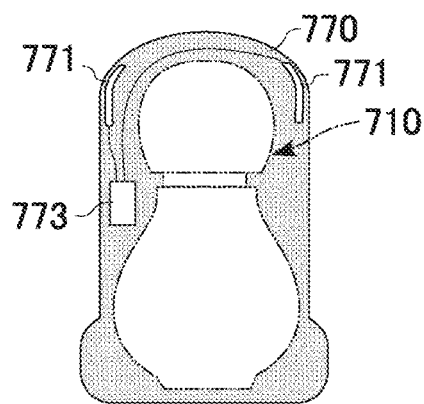
Figure 24B:
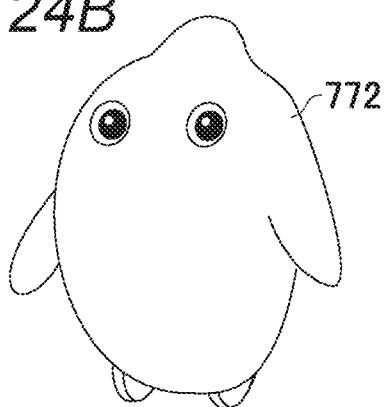
Figure 24E:
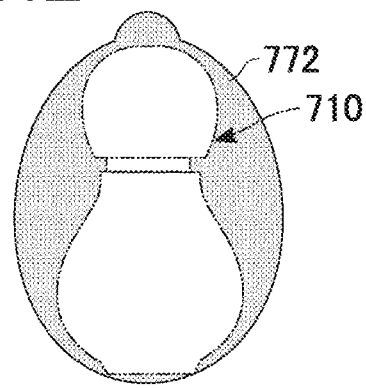
Figure 24C:
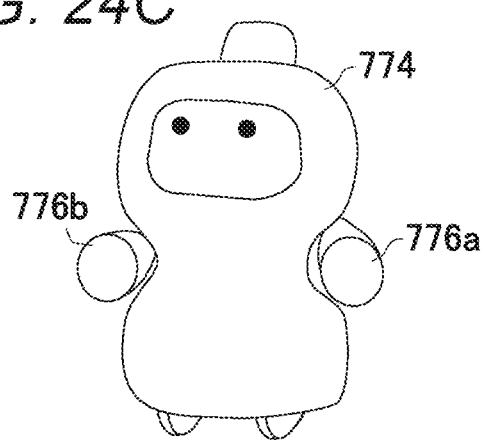
Figure 24F:
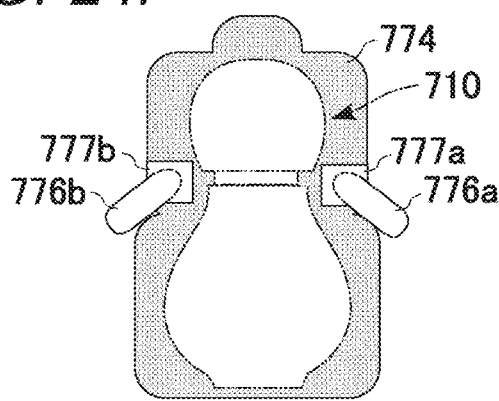

FIGS. 24A to 24F are drawings representing an outer skin according to other modified examples. FIGS. 24A to 24C show variations of an outer skin. FIGS. 24D to 24F show vertical cross-sections of the outer skins, wherein 24D corresponds to 24A, 24E corresponds to 24B, and 24F corresponds to 24C.

A gourd-like outer skin is presented as an example in the heretofore described embodiment, but, for example, a pot-like outer skin 770 may be employed, as shown in FIGS. 24A and 24D. Alternatively, an egg-like outer skin 772 like that shown in FIGS. 24B and 24E, or a rectangular type of outer skin 774 like that shown in FIGS. 24C and 24F, may be employed. By changing a form of a base material (sponge or the like), an external appearance of a robot can be changed by mounting outer skins of various forms, as shown in FIGS. 24D to 24F, without changing the main body frame 710. A form of an outer skin may be changed as appropriate in accordance with a form of a main body frame, a form of an arm portion, or the like.

Also, as shown in FIG. 24D, a touch sensor 771 and a wireless transmitter 773 may be provided in an interior of an outer skin and connected. Also, a signal detected at each touch sensor 771 may be transmitted to the communication unit 142 of a robot. Actuators 777*a* and 777*b*, such as motors, may be provided in an interior of an outer skin, as shown in FIG. 24F. A wireless communicator may be provided in each actuator. The data processing unit 136 can carry out communication with the wireless communicator, and control a drive target (arm portions 777*a*, 777*b*, or the like).

Although not mentioned in the heretofore described embodiment, a configuration may be such that although clothing can be mounted on an outer skin of a robot, attachment and detachment of the outer skin by a user is basically not envisaged. Further, when the outer skin is forcibly removed, a function that detects this may be included in the robot. For example, a sensor that detects an internal temperature may be provided. When the internal temperature drops sharply (when a rate of temperature fall per hour reaches a predetermined value or greater), the data processing unit 136 may determine that the outer skin has been removed.

Alternatively, the data processing unit 136 may determine that the outer skin has been removed when a load of an actuator involved with an operation of the robot decreases abnormally. For example, a sensor that detects a driving torque of a motor is provided, and the data processing unit 136 may determine that the outer skin has been removed when the driving torque when a predetermined operation of the robot is carried out drops below a determination reference value. Alternatively, a light sensor may be provided on an inner side of the outer skin, that is, on a surface of the main body frame 310. The light sensor is provided in a place hidden by the outer skin when the outer skin is mounted normally. The data processing unit 136 may determine that the outer skin has been removed when a detected light intensity exceeds a determination reference value.

When a detachment of the outer skin is detected in this way, an event indicating the matter may be generated, and a predetermined process executed. The data processing unit 136 may execute a process of checking whether each unit operates normally at the next time the robot starts an operation. The data processing unit 136 may output an alarm when a unit does not operate normally. Also, the data processing unit 136 may record a log indicating that a detachment of the outer skin has been detected. The data processing unit 136 may communicate with another robot, cause the other robot to photograph the relevant robot (itself), and leave the photograph on record.

Although not mentioned in the heretofore described embodiment, there is a possibility of a touch by a user being difficult to detect with an incorporated touch sensor when a thickness of a base material increases. Therefore, an independent sensor may be disposed inside an outer skin (inside a base material such as sponge, or between the base material and a fabric bag, or the like), and a value detected by the sensor transmitted to the data processing unit 136 wirelessly or by wire.

Although not mentioned in the heretofore described embodiment, an actuator that can be controlled wirelessly may be disposed inside an outer skin (inside a base material). An independent battery may be disposed inside the outer skin (inside the base material). A configuration may be such that an expanding and contracting body is provided inside the outer skin (inside the base material), and a supply and release of air can be carried out. A configuration may be such that a form of the outer skin can be changed by causing the expanding and contracting body to expand or contract by increasing or reducing air pressure.

This is not mentioned in the heretofore described embodiment, but in order to fix the elastic mounting portion 730 and the bottom face of the trunk portion frame 718, a fastener of a form that complements a surface form of the trunk portion frame 718, as does the fastener 750 of FIGS. 21A to 20C, may be provided on a face of the elastic mounting portion 730 opposing the trunk portion frame 718, and fixing carried out by a projection provided on the fastener and a fitting hole provided on the trunk portion frame 718 side being fitted together. As a soft material is positioned on an outer side of the fastener, the tactile sensation does not change.

A robot of the embodiment is formed of a hard material such as a resin and a soft material such as a fabric. In order to form an external appearance by combining a hard material and a soft material, a fitting structure in which a longitudinal resin material is used, a fitting structure formed of a projection and a fitting hole, a structure fixed by drawing like a mouth of a drawstring bag, and the like, are utilized as appropriate.

Although not mentioned in the modified example shown in FIGS. 20A to 20C, a form of a connection portion of the head portion frame 716 and the face member 712 may be linear when seen from a side. By employing this kind of configuration, processing (cutting) of the aperture portion 717 in the head portion frame 716 is facilitated. Also, when drawing the aperture portion 502 by pulling both ends of the string 742, a force in a direction away from the head portion frame 716 is unlikely to act on the face member 712, and workability when attaching the outer skin 714 improves.

Although not mentioned in the heretofore described embodiment, an air inlet port and an air exhaust port may be provided in predetermined places in a main body frame, and external air may be caused to circulate in an interior. By so doing, a heat generating part in the interior can be cooled. Further, a relatively large number of apertures may be disposed in each of portions of an outer skin (base material) corresponding to the air inlet port and the air exhaust port (or in a vicinity of the air inlet port and the air exhaust port). Alternatively, an area per aperture may be relatively large. By so doing, ventilation of the main body frame can be promoted.

What is claimed is:

1. A robot comprising:
a main body;
a projection extending from a surface of the main body; and
an outer skin configured to removably cover the main body, wherein the outer skin comprises:
an engagement portion configured to engage with the main body;
an extended portion extending from the engagement portion, wherein the extended portion comprises:
a first extended portion extending from the engagement portion; and
a second extended portion extending from the engagement portion;
an elastic portion connecting ends of the first extended portion and the second extended portion farthest from the engagement portion; and
a hole, wherein the projection is configured to extend through the hole while the outer skin is covering the main body, wherein
the engagement portion comprises a bag form portion configured to cover an end portion of the main body,
the main body comprises a trunk portion and a head portion that are displaceable relative to each other,
the bag form portion is configured to cover the head portion, and
the projection is in the trunk portion.

2. The robot according to claim 1,
wherein
the outer skin comprises an attachment member facing the main body, and, while the outer skin is covering the main body, a peripheral edge of the attachment member positioned between the outer skin and the main body.

3. The robot according to claim 1,
wherein the hole is in the elastic portion.

4. The robot according to claim 3, wherein the elastic portion has an elasticity different from an elasticity of each of the engagement portion, the first extended portion and the second extended portion.

5. The robot according to claim 1, wherein
the first extended portion extending from the bag form portion; and
the second extended portion extending from the bag form portion.

6. The robot according to claim 1, wherein the outer skin further comprises:
a base material having elasticity; and
a fabric bag enclosing the base material.

7. The robot according to claim 1, further comprising:
a recessed fitting portion along an outer surface of the main body, wherein the outer skin has an aperture portion at a position corresponding to the recessed fitting portion; and
a string following an edge of the aperture portion, wherein a size of the aperture portion is adjustable using the string, and the edge of the aperture portion is configured to fit into the recessed fitting portion.

8. The robot according to claim 1, wherein
the main body comprises a trunk portion and a head portion that are displaceable relative to each other,
the robot further comprising:
a fitting portion in the head portion, and
an aperture portion in the engagement portion, wherein the outer skin is positionable on the main body by the aperture portion being fitted in the fitting portion.

9. The robot according to claim 1, further comprising:
a sensor in the main body; and
a data processor configured to determine whether there is a detachment of the outer skin from the main body based on information detected by the sensor.

10. The robot according to claim 9, wherein the data processor is configured to execute a predetermined process in response to a determination that the outer skin has become detached from the main body.

11. A robot comprising:
a main body;
a fitting portion defined in an outer surface of the main body; and
an outer skin configured to removably cover the main body, wherein the outer skin comprising:
a fitting member having a form complementing the fitting portion, wherein the fitting member is configured to fit into the fitting portion while the outer skin is covering the main body,
a base material having elasticity; and
a fabric bag enclosing the base material, wherein the fabric bag defines an opening for receiving the main body, the opening has a peripheral edge portion, and the fitting member is in the peripheral edge portion of the fabric bag;
a recessed fitting portion along the outer surface of the main body, wherein the outer skin has an aperture portion at a position corresponding to the recessed fitting portion; and
a string following an edge of the aperture portion, wherein a size of the aperture portion is adjustable using the string, and the edge of the aperture portion is configured to fit into the recessed fitting portion.

12. The robot according to claim 11, wherein the fitting portion extends along the outer surface of the main body.

13. The robot according to claim 11, wherein the main body has a first portion,
the fitting portion surrounds a periphery of the first portion,
the outer skin has an aperture portion for exposing the first portion, and
the fitting member extends inward from a periphery of the aperture portion.

14. The robot according to claim 11, further comprising:
a sensor; and
a data processor configured to determine whether there is a detachment of the outer skin from the main body based on information detected by the sensor.

15. The robot according to claim 14, wherein the data processor is configured to execute a predetermined process in response to a determination that the outer skin has become detached from the main body.

16. A robot comprising:
a main body;
a projection extending from a surface of the main body; and
an outer skin configured to removably cover the main body, wherein the outer skin comprises:
   an engagement portion configured to engage with the main body;
   an extended portion extending from the engagement portion, wherein the extended portion comprises:
   a first extended portion extending from the engagement portion; and
   a second extended portion extending from the engagement portion;
   an elastic portion connecting ends of the first extended portion and the second extended portion farthest from the engagement portion; and
a hole, wherein the projection is configured to extend through the hole while the outer skin is covering the main body, wherein
   the main body comprises a trunk portion and a head portion that are displaceable relative to each other,
   the robot further comprising:
   a fitting portion in the head portion, and
   an aperture portion in the engagement portion, wherein the outer skin is positionable on the main body by the aperture portion being fitted in the fitting portion.

* * * * *